United States Patent
Lucas et al.

(10) Patent No.: US 7,836,119 B2
(45) Date of Patent: Nov. 16, 2010

(54) DISTRIBUTED EXECUTION MODEL FOR CROSS-ORGANIZATIONAL DECLARATIVE WEB APPLICATIONS

(75) Inventors: Bruce David Lucas, Mohegan Lake, NY (US); Rahul P. Akolkar, Tuckahoe, NY (US); Charles F. Wiecha, Hastings-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 12/112,081

(22) Filed: Apr. 30, 2008

(65) Prior Publication Data

US 2009/0276479 A1  Nov. 5, 2009

(51) Int. Cl.
 *G06F 15/16* (2006.01)
(52) U.S. Cl. ...................................... 709/201; 709/229
(58) Field of Classification Search ................ 709/201, 709/203, 225, 226, 229; 717/105; 712/28; 707/6; 370/351
See application file for complete search history.

(56) References Cited

U.S. PATENT DOCUMENTS

| | | | |
|---|---|---|---|
| 5,195,172 | A | 3/1993 | Elad et al. |
| 5,835,683 | A | 11/1998 | Corella et al. |
| 6,996,800 | B2 | 2/2006 | Lucassen et al. |
| 7,028,306 | B2 | 4/2006 | Boloker et al. |
| 7,072,934 | B2* | 7/2006 | Helgeson et al. ............ 709/203 |
| 7,092,940 | B1* | 8/2006 | Ethen et al. ..................... 707/6 |
| 2004/0143725 | A1* | 7/2004 | Addison ....................... 712/28 |
| 2006/0041661 | A1* | 2/2006 | Erikson et al. .............. 709/225 |
| 2008/0120594 | A1* | 5/2008 | Lucas et al. ................. 717/105 |
| 2008/0298342 | A1* | 12/2008 | Appleton et al. ............ 370/351 |
| 2009/0037512 | A1* | 2/2009 | Barsness et al. ............. 709/201 |

OTHER PUBLICATIONS

Agha et al.; "A Foundation for Actor Computation"; J. Functional Programming 1 (1):1-000, Jan. 1993; 59 pages.

Bonner "Workflow, Transactions and Datalog"; Proceeding of the 18th ACM Symposium on Principles of Database Systems (PODS) May 31-Jun. 2, 1999; 67 pages.

Fielding, "Architectural Styles and the Design of Network-based Software Architectures", PhD thesis, University of California, 2000; 180 pages.

Kiczales et al., "Aspect-Oriented Programming" ACM Computing Surveys 28, 4es; 1996; 14 pages.

Liu, "Extending Datalog with Declarative Updates", Journal of Intelligent Information Systems; 2002; 23 pages.

Milner et al., "A Calculus of Mobile Processes, Part I", Information and Computation 100, 1990; 46 pages.

(Continued)

*Primary Examiner*—Le Luu
(74) *Attorney, Agent, or Firm*—Tutunjian & Bitetto, P.C.; Stephen C. Kaufman, Esq.

(57) ABSTRACT

A system and method for distributed computation includes providing a first service of a first computation node in a network of nodes, the first service having a first resource, the first resource including one of references to data and other resources. In a second service on a second computation node, the first resource is reference-able by associating the first resource in the second service for use in the second service. A distributed computation is performed across node boundaries using the references of the first resource to perform the computation in the first service and in the second service.

19 Claims, 33 Drawing Sheets

OTHER PUBLICATIONS

Milner et al., "A Calculus of Mobile Processes, Part II", Information and Computation 100, 1990; 41 pages.

D. Harel et al., Statemate: A Working Environment for the Development of Complex Reactive Systems; IEEE; 1998; 11 pages.

Bernard Houssais, "The Synchronous Programming Language SIGNAL A Tutorial", IRISA. ESPRESSO Project; Apr. 15, 2002; 48 pages.

Topor, "Safe Database Queries with Arithmetic Relations" Proc. of the14th Australian Computer Science Conference; 1991; 12 pages.

X. Wang, "Negation in Logic and Deductive Databases" PhD Thesis; University of Leeds; 1999; 180 pages.

Berry et al., "The Esterel Synchronous Programming Language: Design, Semantics, Implementation", Science of Computer Programming 1992; 51 pages.

Dong et al., "Nonrecursive Incremental Evaluation of Datalog Queries", Database Theory—ICDT' 92, 4th Int'l Conf.; Germany, 1992; revised May 1994; 35 pages.

http://www.flapjax-lang.org/tutorial/; printed May 30, 2007; 10 pages.

Cooper et al., Links: Web Programming without Tiers, ESOP; 2007; 12 pages.

Caspi et al., "LUSTRE: A Declarative Language for Programming Synchronous Systems", 1986; POPL1987; 11 pages.

Paton et al., "Active Database Systems", ACM Comput. Surv. 31, 1 1999; 47 pages.

Harris et al., Composable Memory Transactions: Post-publication version: Aug. 18, 2006; PPoPP '05; 13 pages.

Halbwachs et al., "A Tutorial of LUSTRE", This Document is an introduction to the language LUSTRE-V4; Jan. 24, 2002; 26 pages.

Bray et al., Extensible Markup Language (XML) 1.0 (Fourth Edition), Aug. 16, 2006: http://www.w3.org/TR/2006/REC-xml-20060816; 2006; 42 pages.

Manola et al., RDF Primer, W3C Recommendation; Feb. 10, 2004; http://www.w3.org/TR/2004/REC-rdf-primer-20040210/; 2004; 78 pages.

Clark et al., XML Path Language (XPath) Version 1.0; W3C Recommendation, Nov. 16, 1999; http://www.w3.org/TR/1999/REC-xpath-19991116; 1999; 33 pages.

Boyer et al., XForms 1.0 (Second Edition) W3C Recommendation, Mar. 14, 2006; http:www.w3.org.TR.2006/REC-xforms-20060314/; 2006; 126 pages.

\* cited by examiner

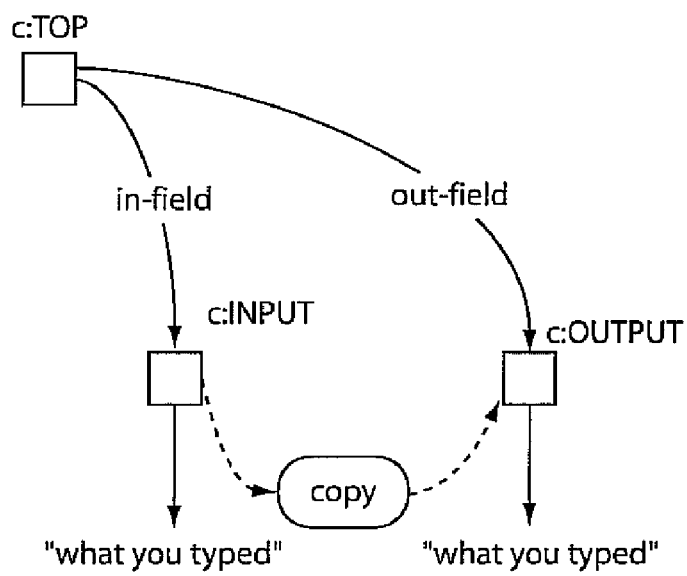
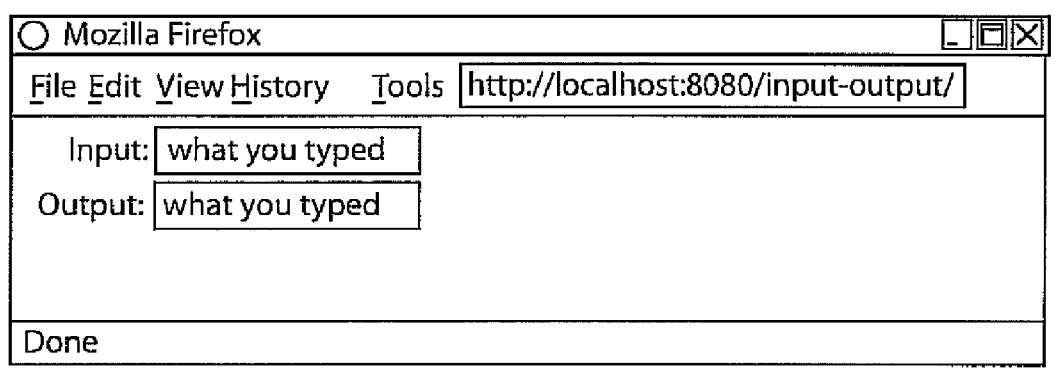
FIG. 17

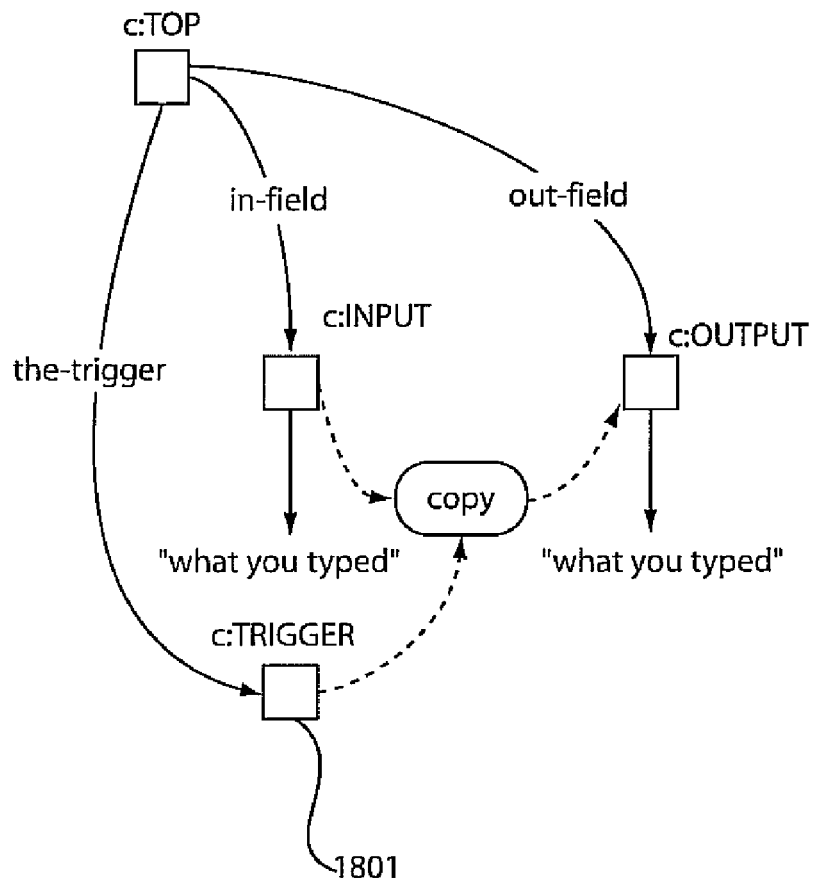
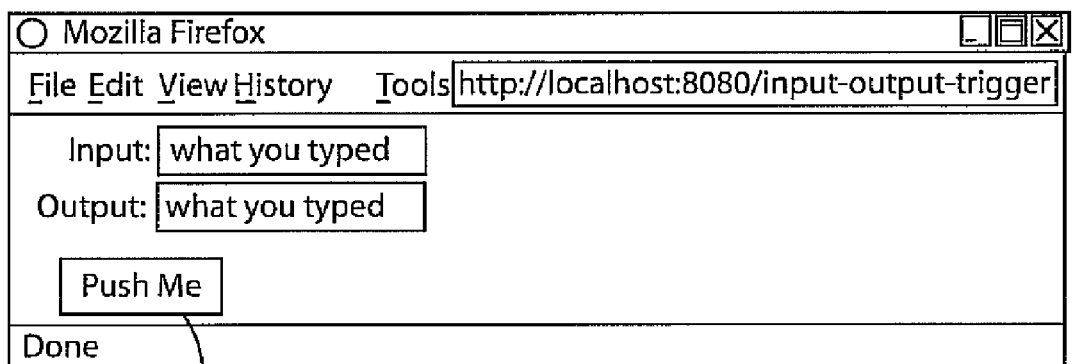
FIG. 18

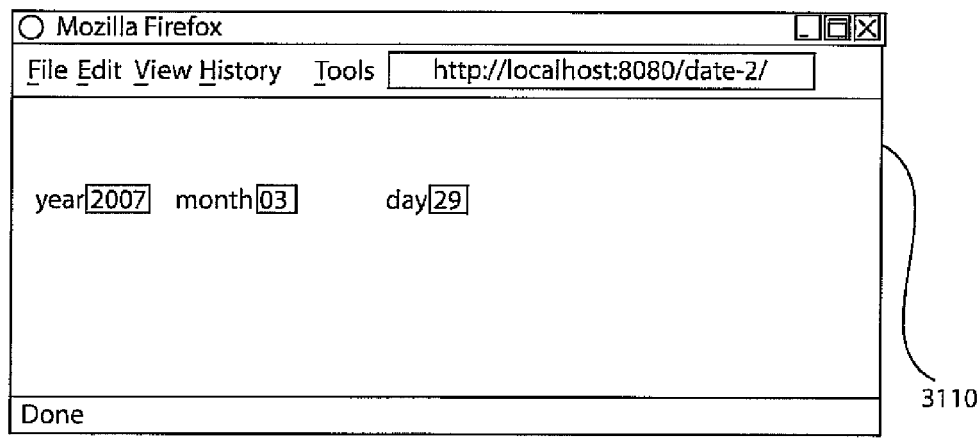
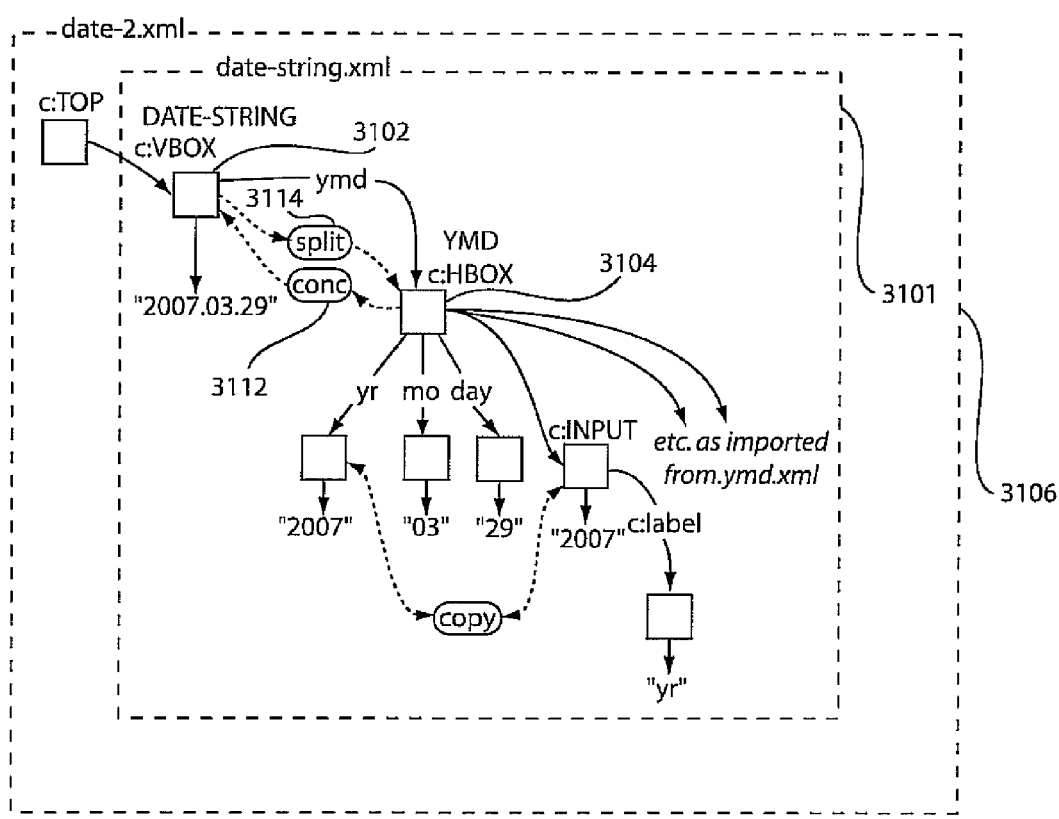
FIG. 31

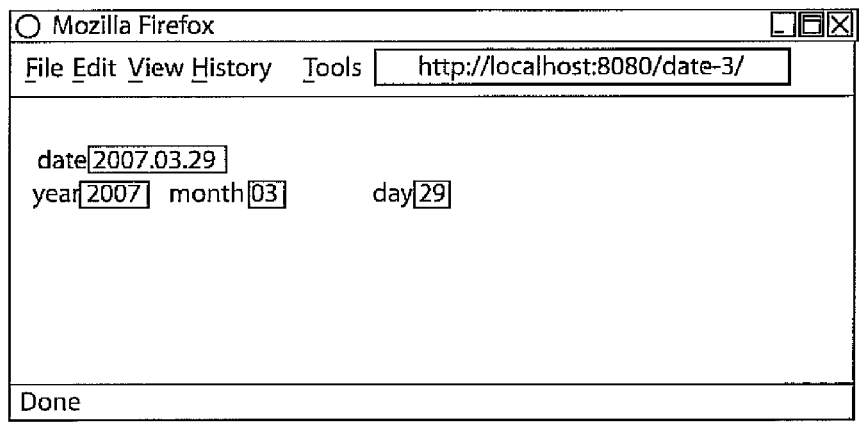
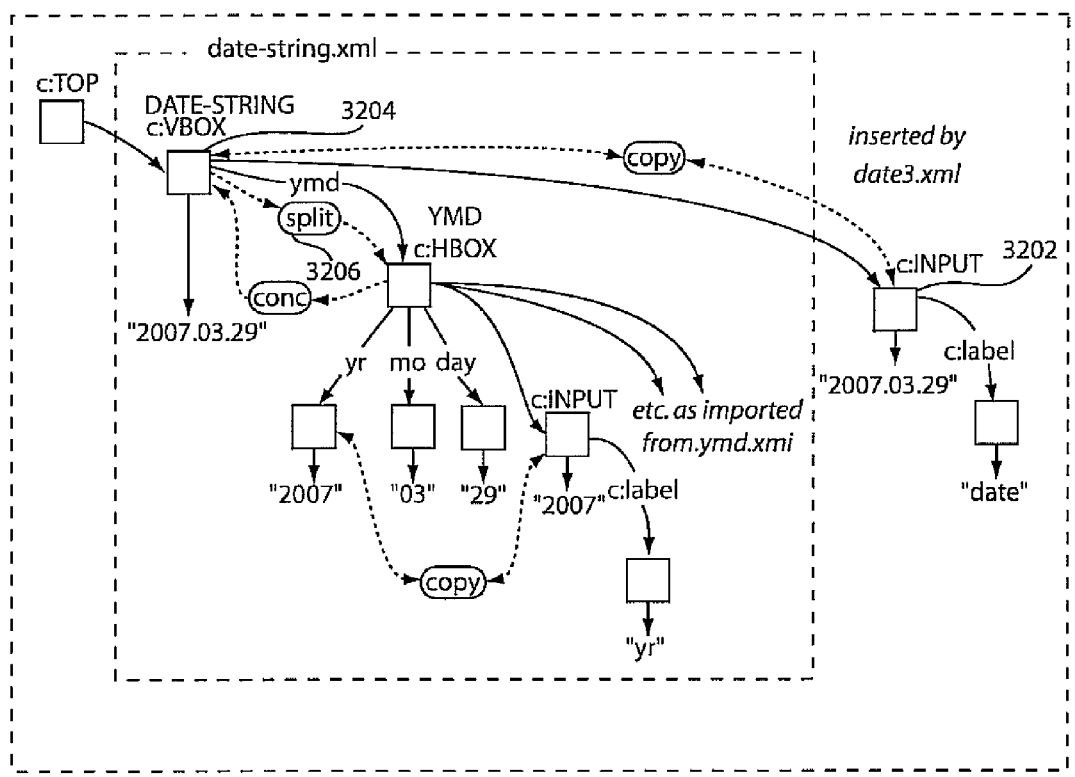
FIG. 32

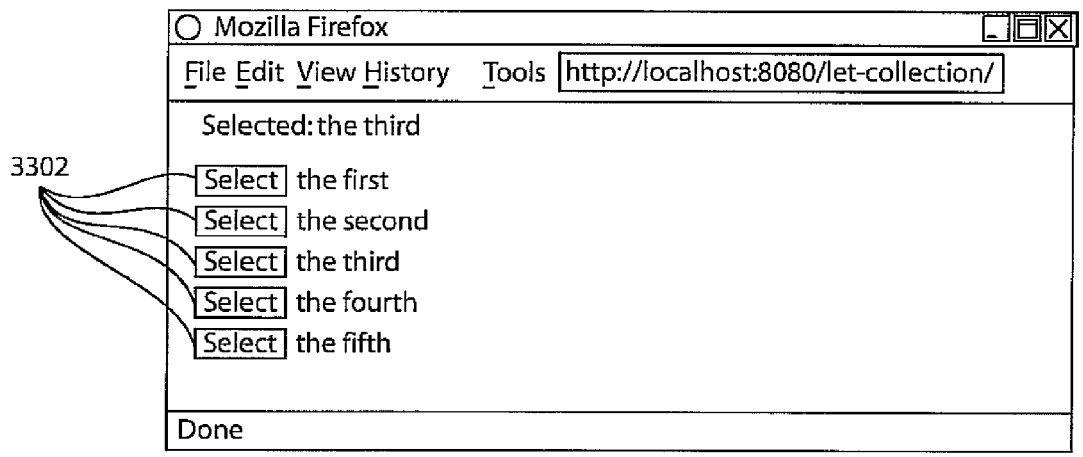
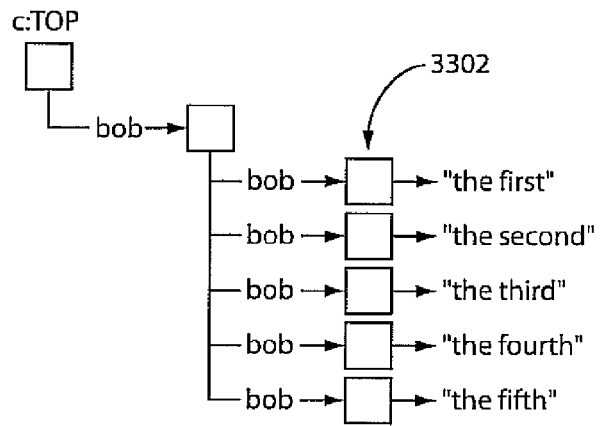
FIG. 33

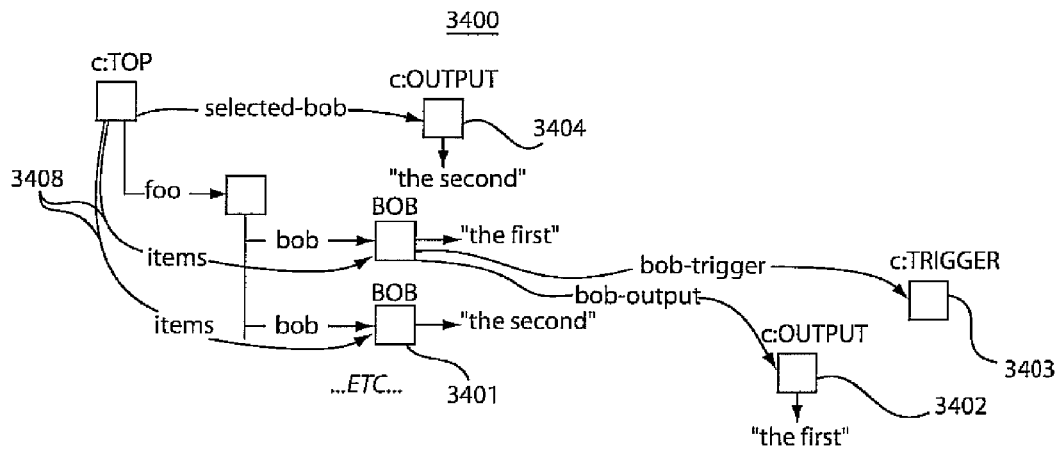
FIG. 34
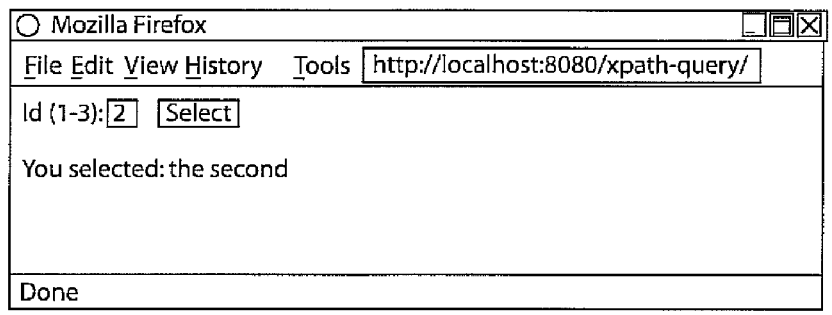
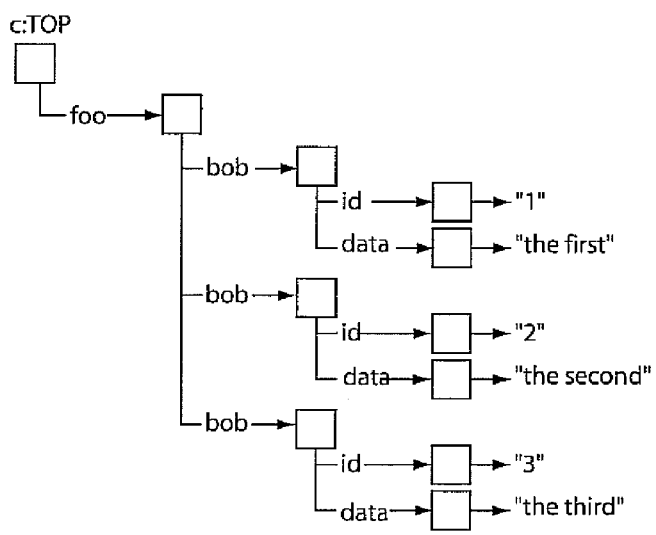
FIG. 35

*every resource of class DATE has a yr, mo. and data resources as its value*

```
<c:with anchor="DATE">
  <c:create-structure>
    <yr/>
    <mo/>
    <da/>
  </c:create-structure>
</c:with>
```

*classify every DATE resource as a DATE3 resource as well*

```
<c:let anchor="DATE" class="DATE3"/>
```

*every DATE3 resource has three associated input fields whose values are bound to the yr, mo, da values*

```
<c:with anchor="DATE3">
  <c:create-view class="c:INPUT" ref="yr">
    <c:out path="c:label">year</c:out>
  </c:create-view>
  <c:create-view class="c:INPUT" ref="mo">
    <c:out path="c:label">month</c:out>
  </c:create-view>
  <c:create-view class="c:INPUT" ref="da">
    <c:out path="c:label">day</c:out>
  </c:create-view>
</c:with>
```

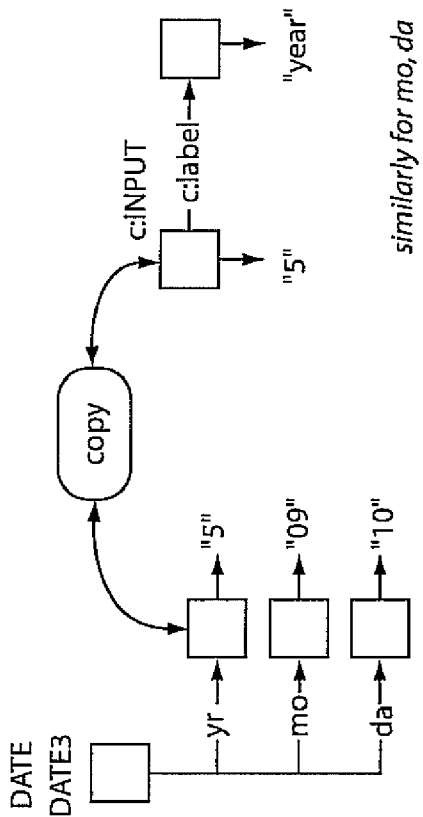

FIG. 42

DISTRIBUTED EXECUTION MODEL FOR CROSS-ORGANIZATIONAL DECLARATIVE WEB APPLICATIONS

CROSS-REFERENCE TO RELATED APPLICATIONS

This application is related to application Ser. No. 11/756,707, filed on Jun. 1, 2007, application Ser. No. 12/047,385 filed on Mar. 13, 2008, and application Ser. No. 12/106,690 filed on Apr. 21, 2008 which are all incorporated herein by reference in their entirety.

BACKGROUND

1. Technical Field

The present invention relates to programming models and more particularly to systems and methods for providing models that unify several data models and related execution models in common use.

2. Description of the Related Art

In modern web applications, traditional boundaries between browser-side presentation logic, server-side "business" logic, and logic for persistent data access and query are rapidly blurring. This is particularly true in so-called web mash-ups, which bring a variety of data sources and presentation components together in a browser, often using asynchronous ("AJAX") logic. Such applications must currently be programmed using an agglomeration of data access languages, server-side programming models, and client-side scripting models meaning that programs have to entirely rewritten or significantly changed to be shifted between tiers. The large variety of languages involved also means that components do not compose well without painful amounts of scaffolding.

While the trend towards loosely-coupled inter-networked software is inexorable, programming models and runtime systems are largely designed for building monolithic, free-standing applications. While the web has vastly increased the scale of distribution, web applications are currently programmed and deployed in a manner not that different from mainframe applications of the 1960s.

The mismatch between programming models/runtimes, and the predominance of inter-networked software is becoming a significant impediment to producing and composing reliable application software in a timely manner—and this mismatch is at the heart of much of the dissatisfaction developers have expressed with the complexity and obscurity of current middleware, programming models, and development tools.

SUMMARY

A system and method for distributed computation includes providing a first service of a first computation node in a network of nodes, the first service having a first resource, the first resource including one of references to data and other resources. In a second service on a second computation node, the first resource is reference-able by associating the first resource in the second service for use in the second service. A distributed computation is performed across node boundaries using the references of the first resource to perform the computation in the first service and in the second service.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

FIG. 17 is a diagram and display demonstrating the use of a c:bind construct to connect input and output resources in accordance with the present principles;

FIG. 18 is a diagram and display demonstrating the use of a trigger control with a c:bind construct in accordance with the present principles;

FIG. 31 is a diagram and display for demonstrating definition and use of another reusable compositional unit of FIG. 29 by creating a top-level resource in accordance with the present principles;

FIG. 32 is a diagram and display for demonstrating customization of the reusable compositional unit of FIG. 30 by creating a top-level resource in accordance with the present principles;

FIG. 33 is a diagram, code and display for demonstrating the use of a c:let construct;

FIG. 34 is a diagram showing the use of the c:let construct on the content of FIG. 33;

FIG. 35 is a diagram and display for demonstrating the use of XPATH for querying data in a component or collection in accordance with the present principles;

FIG. 42 is a diagram showing a compositional model with code and a corresponding graphical representation in accordance with one illustrative embodiment.

DETAILED DESCRIPTION OF PREFERRED EMBODIMENTS

Figure 1:
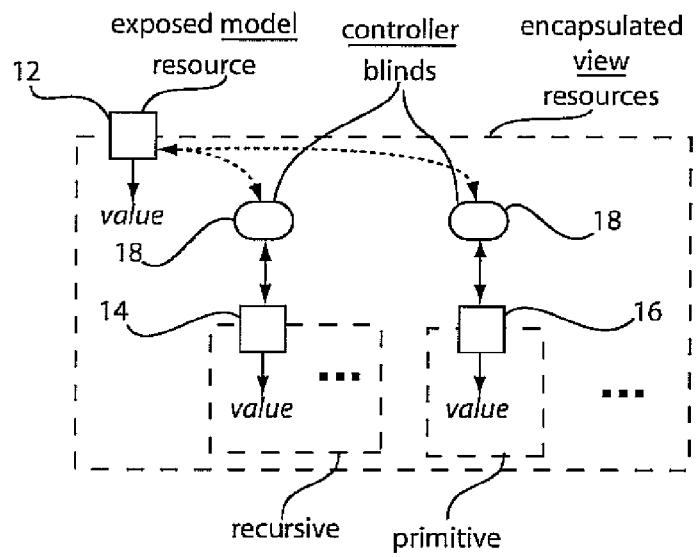
FIG. 1 is a diagram showing a model view controller (MVC) employing templates or models which are created using an exposed model in accordance with one embodiment.

In accordance with the present principles, a simplified declarative programming model and runtime are provided which are expressly targeted at building and deploying cross-organizational software as compositions of web components. In addition, an evolutionary style of software development is supported that permits rapid application prototyping, but also enables progressive refinement of an initial prototype into a hardened asset. A simplified and uniform set of language features addressing end-to-end application design, including business objects, user interaction, and "last-mile" issues such as device adaptation, and multi-modal and multi-device interaction will be described. The programming language in accordance with the present principles may be referred to herein as "Collage" for ease of reference.

A single declarative language is provided to support enterprise, web and client applications, hence reducing complexity from multiple redundant abstractions. A resource description framework (RDF) based approach to the programming model used in accordance with the present principles does not impose encapsulation as strictly as in traditional object-oriented (OO) languages. Cross-organizational composition, and the attendant distribution of components, is easier using declarative data-driven programming models than using procedural or object-oriented languages. It should be understood that user interface (UI) elements described herein are illustratively shown using XForms. These elements are modeled here using e.g., RDF and participate in the Collage execution model.

Dealing with the constraints and variety of multiple end-user interaction devices has long been a challenge for user interface (UI) frameworks, whether web based or not. In accordance with the present principles, one contribution to this problem is to approach the problem as a reuse of a uniform set of concepts rather than as an ad-hoc framework addressed specifically to this "last-mile" problem, as has often been the case in the past. We apply the same language features introduced to support transformations and mapping among business objects, and between business objects and the UI, to support device adaptation as well.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A presentation and user interaction model in accordance with the present principles allows the description of user interfaces, or application "front-ends", at a range of levels of abstraction. A recursive Model View Controller (MVC) pattern is supported, allowing the developer to refine an abstract user interface description through successive levels of more concrete specification.

Referring now to the drawings in which like numerals represent the same or similar elements and initially to FIG. 1, a recursive MVC model 10 is illustratively depicted. A model of an instance of an MVC pattern is represented by a resource 12 in accordance with the present principles. A view of MVC is a set of resources 12, 14, 16 associated with the model, whose instantiation is declaratively driven by the <c:create> construct. A controller of MVC is a set of <c:bind> constructs 18 that update the model resource 12 in response to updates to the view resources 14, 16, and vice versa.

The set of resources (12, 14 and 16) that comprise a view of a model resource 12 may themselves serve as models for other views, thus supporting a recursive MVC pattern. The set of resources comprising a view, together with the <c:bind>-based controller 18 that connects the view resources 14 and 16 with the model resource 12, may also be seen as a more concrete refinement of an abstraction represented by the model 10. Conversely, the model 10 may be viewed as an encapsulation of the functionality provided by the view.

The present approach to presentation enables the description of user interfaces at a range of levels of abstraction. The progressive refinement towards the concrete user interface allows for separation of concerns during development. The ability to refine the presentation from higher towards lower levels of abstraction facilitates reuse.

Each instance of this MVC pattern is referred to as an abstract interaction unit. The development of a user interface as provided herein centers around abstract interaction units, and in particular, around the definition of the semantics of the class of an abstract interaction unit's model resource (12). The model class is given application-specific semantics by using it as the anchor class for a set of program constructs that define the semantics. A developer defines the class representing a composite abstract interaction unit by declaratively decomposing it into a collection of subordinate interaction units defined elsewhere. The developer also specifies controller logic that connects the composite and subordinate interaction units. At each level of the MVC recursion, the patterns representing the MVC concepts remain consistent. The classification of the composite interaction unit is used as the anchor class for aggregating constructs that create the subordinate interaction units and connect them to the composite interaction unit. For example, <c:create> is used to specify the creation of subordinate interaction units based on the classification of the composite interaction unit, and <c:bind> is used to specify the controller logic that connects the composite and subordinate interaction units. This uniform state and processing model eases refinement, adaptation and extension at each level.

A variety of composition patterns are supported in this way: In a typical composition pattern, a subordinate interaction unit is created corresponding to each piece of the model of the composite interaction unit that needs to be presented to the user or collected from the user. Collections of interaction units may be aggregated based on application semantics, constituting an abstract form. Interaction units may be designed with an eye to re-use, or they may be designed for a single use. The pattern described above supports either use case equally.

The MVC recursion is grounded in built-in abstract interaction primitives, such as c:INPUT, c:OUTPUT, and c:TRIGGER, each of which represents a primitive unit of presentation and associated reactive behavior. The abstract interaction primitives are discussed in greater detail below.

Necessary user interface layout information for each interaction unit is then specified in terms of an associated abstract layout tree. The layout tree comprises a set of layout containment triples whose predicate is a layout containment property, c:contains. Each layout containment triple connects: 1) An abstract layout container represented by the subject resource whose class indicates the style of layout. Examples of abstract layout container classes include c:VBOX (representing a vertical flow), c:HBOX (representing a horizontal flow), c:GRID (representing a tabular grid) and c:TOP (representing a top-level container, such as a window). 2) A containee, represented by the object resource. The containee may be either another abstract layout unit, or an abstract interaction unit as described above. Thus, the leaves of the layout tree are abstract interaction units.

Styling information is added similarly, either interspersed with layout information or separately per developer choice, using the Collage styling property c:style. The subjects in styling triples may be either interaction units or layout units, e.g., using RDF in one embodiment. Top level user interaction window resources have a c:TOP classification. An abstract layout tree is presented to the user by either connecting the root of the tree to a c:TOP resource via a containment triple (e.g., an RDF term), or by multiply classify the root of a layout tree as a c:TOP. Page flow is achieved by using classification and containment mechanisms to dynamically change the content of a top-level window.

Abstract interaction primitives: The present embodiments provide built-in abstract interaction primitives, which form the basis of the user interface or application "front-end" definition. The built-in primitives are illustratively modeled in RDF and each constitutes an abstract unit of user interaction, encapsulating an element of an abstract user interface. These built-in primitives are defined as resource classifications. The built-in set of primitives provides a common ground for development of various concrete user interfaces, such as for supporting different types of devices and interaction modalities.

An abstract interaction primitive specifies both the presentation of its model information to the user, and the response of the system to user interaction with the presented information, if any. This is achieved by having each of the resource classifications for these interaction primitives also specify the built-in dependent structure for that interaction primitive, and associating specific semantics with each resource within the dependent structure. For example, the c:INPUT abstract interaction primitive is used to collect a single piece of information, e.g., as an RDF literal. The dependent structure for c:INPUT, the application code that supplies its values, and a possible rendering are exemplified in FIG. 2.

Figure 2:
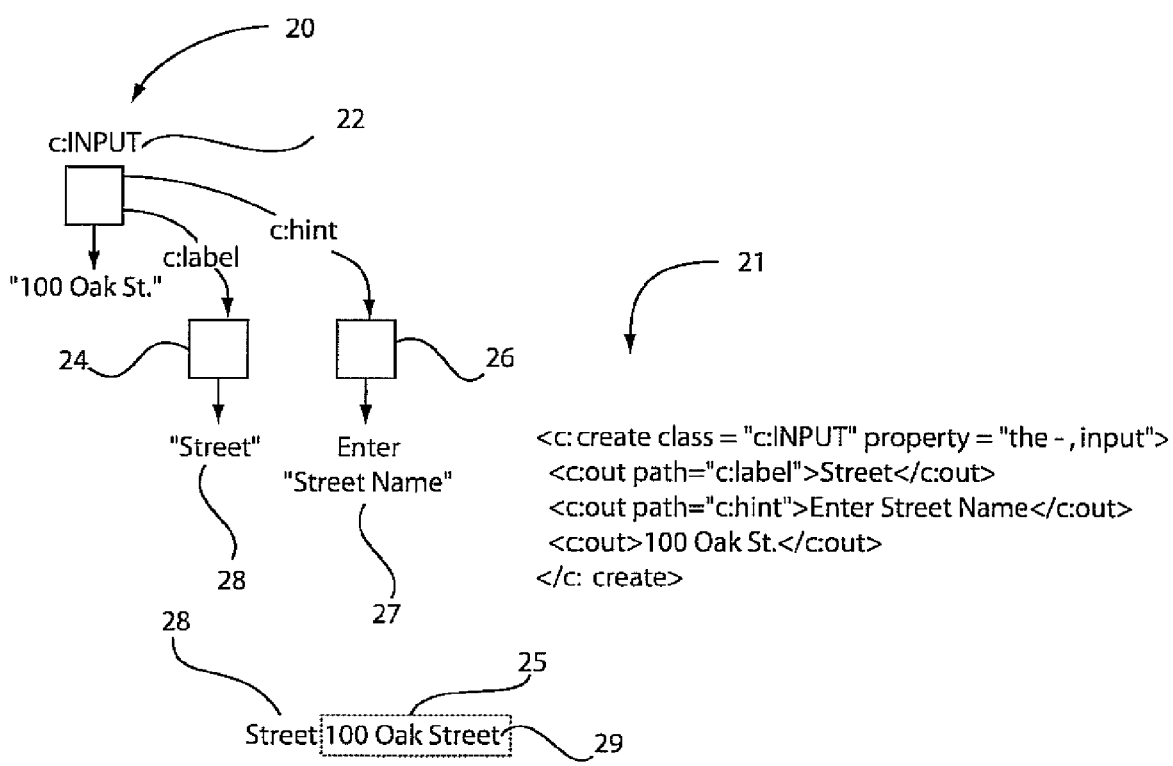
FIG. 2 is a diagram, display and program code demonstrating the use of a c:input primitive in accordance with a declarative programming language (Collage) in accordance with the present principles.

Referring to FIG. 2, a c:INPUT primitive represents a simple one-line input field. A c:INPUT primitive includes three resources: 1) The c:INPUT resource 22; 2) A dependent resource 24 connected to the c:INPUT resource by a c:label predicate; 3) A dependent resource 26 connected to the c:INPUT resource by a c:hint predicate. Furthermore, the following semantics are associated with this dependent structure: 1) The value associated with the label resource is to be presented to the user to indicate what response is desired for this unit of interaction; 2) The value associated with the hint resource is to be presented to the user when the user desires assistance with this unit of interaction; 3) The value of the c:INPUT resource at all times represents the current value of the input field as seen by the user. Thus, the value associated with the c:INPUT resource initially represents the default value of the input field, and subsequently represents the response from the user for this unit of interaction.

In the concrete rendering of the c:INPUT abstract interaction primitive shown in FIG. 2, a value 28 of the label resource appears alongside a textbox 25 and a value 27 of the hint resource is used as tooltip text for the textbox. A value 29 entered by the user in the textbox 24 becomes the value of the abstract interaction primitive resource. The refinement of the abstract user interface primitive to a concrete user interface is done using a renderkit, described hereinafter.

When the user enters a new value into the input field, the system responds by changing the value of the c:INPUT resource, which generates an update of the c:INPUT resource that in turn initiates an execution cycle. Thus, associated reactive behavior that is concerned with the value changes of the c:INPUT resource can be declaratively specified using <c:bind> constructs where one of its active inputs is the c:INPUT resource above. In FIG. 2, an RDF data model 20 is employed to distinguish data (value) from meta-data (non-value), e.g., value="100 Oak St." versus non-value (c:label, c:hint). Also, associated code 21 is shown.

A set of built-in primitives will now be illustratively described and provide a basis for a portable user interface definition in accordance with the present principles. This set of built in primitive is by no means a complete set of user interface elements. Indeed, an application may declaratively specify an additional set of resource classifications for other abstract user interface elements. These may be at the same user interface granularity as the built-in primitives, or be aggregations thereof.

Abstract presentation and interaction primitives:

```
c:INPUT:
<c:create class="c:INPUT" property="the-input">
<c:out path="c:label">Street</c:out>
<c:out path="c:hint">Enter Street Name</c:out>
<c:out>100 Oak St.</c:out>
</c:create>
```

Figure 3:
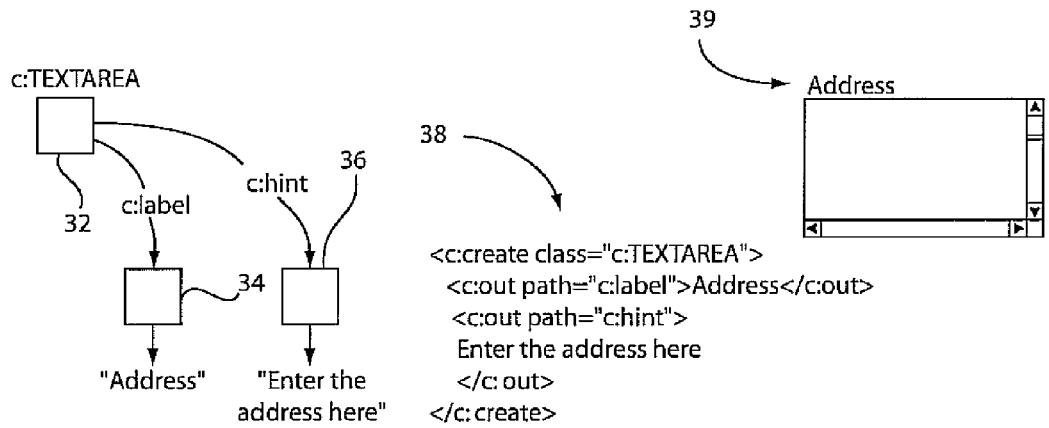
FIG. 3 is a diagram, display and program code demonstrating the use of a c:textarea primitive in accordance with a declarative programming language (Collage) in accordance with the present principles.
Figure 4:
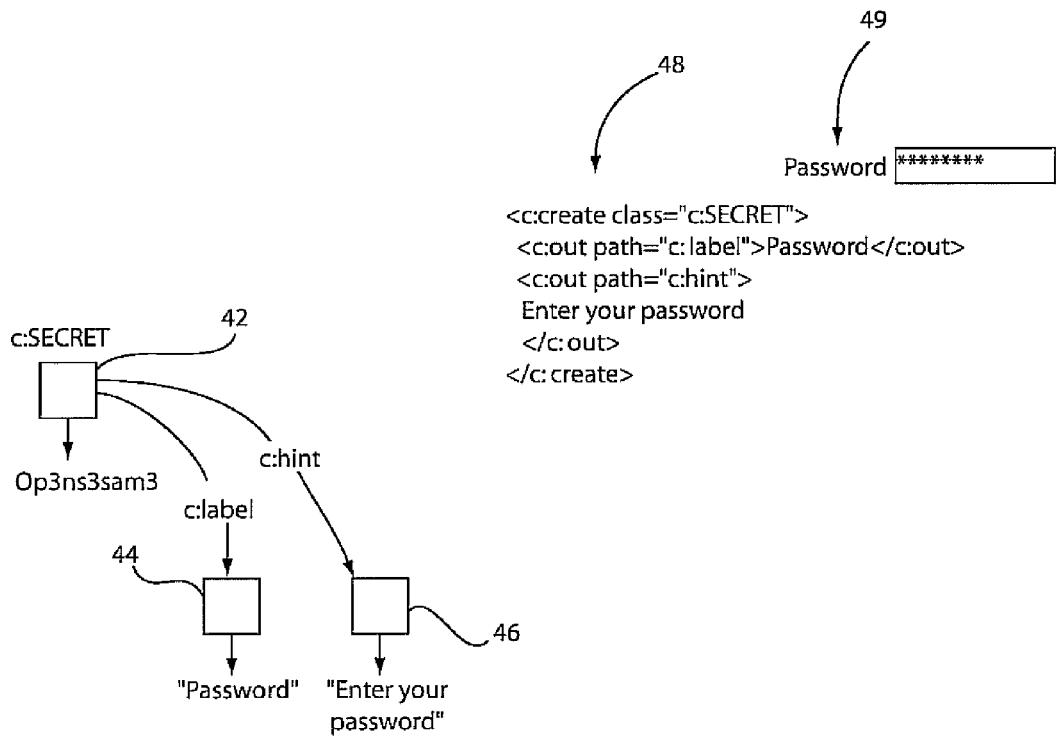
FIG. 4 is a diagram, display and program code demonstrating the use of a c:secret primitive in accordance with a declarative programming language (Collage) in accordance with the present principles.
Figure 5:
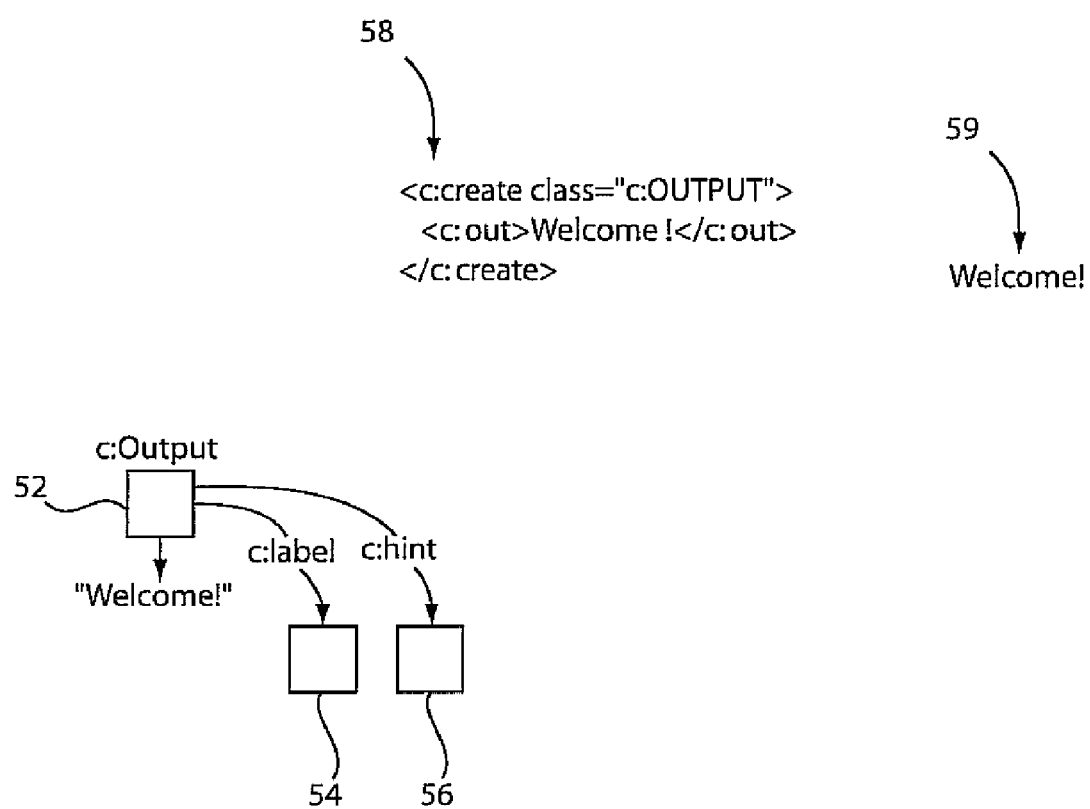
FIG. 5 is a diagram, display and program code demonstrating the use of a c:output primitive in accordance with a declarative programming language (Collage) in accordance with the present principles.
Figure 6:
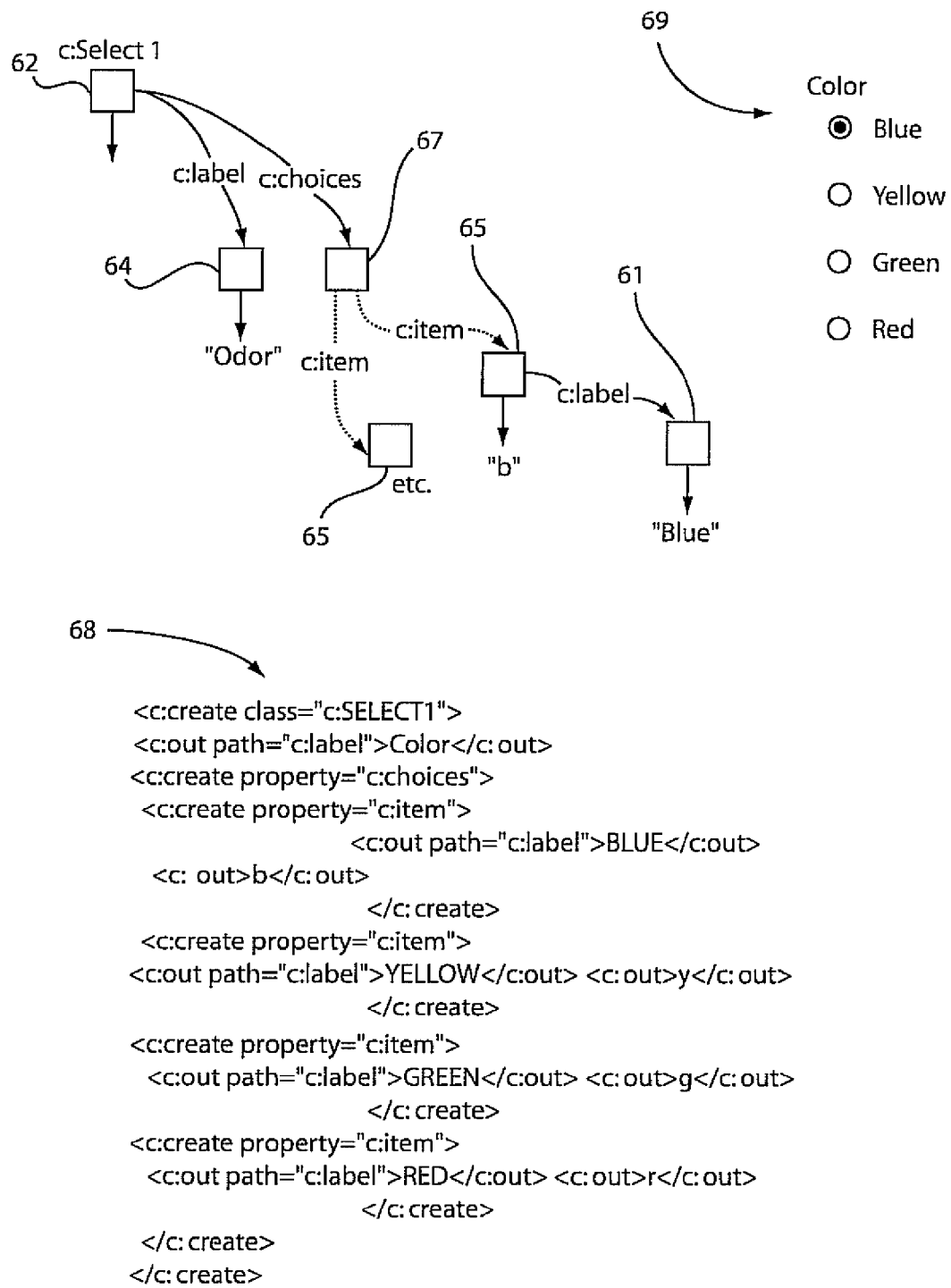
FIG. 6 is a diagram, display and program code demonstrating the use of a c:select1 primitive in accordance with a declarative programming language (Collage) in accordance with the present principles.
Figure 7:
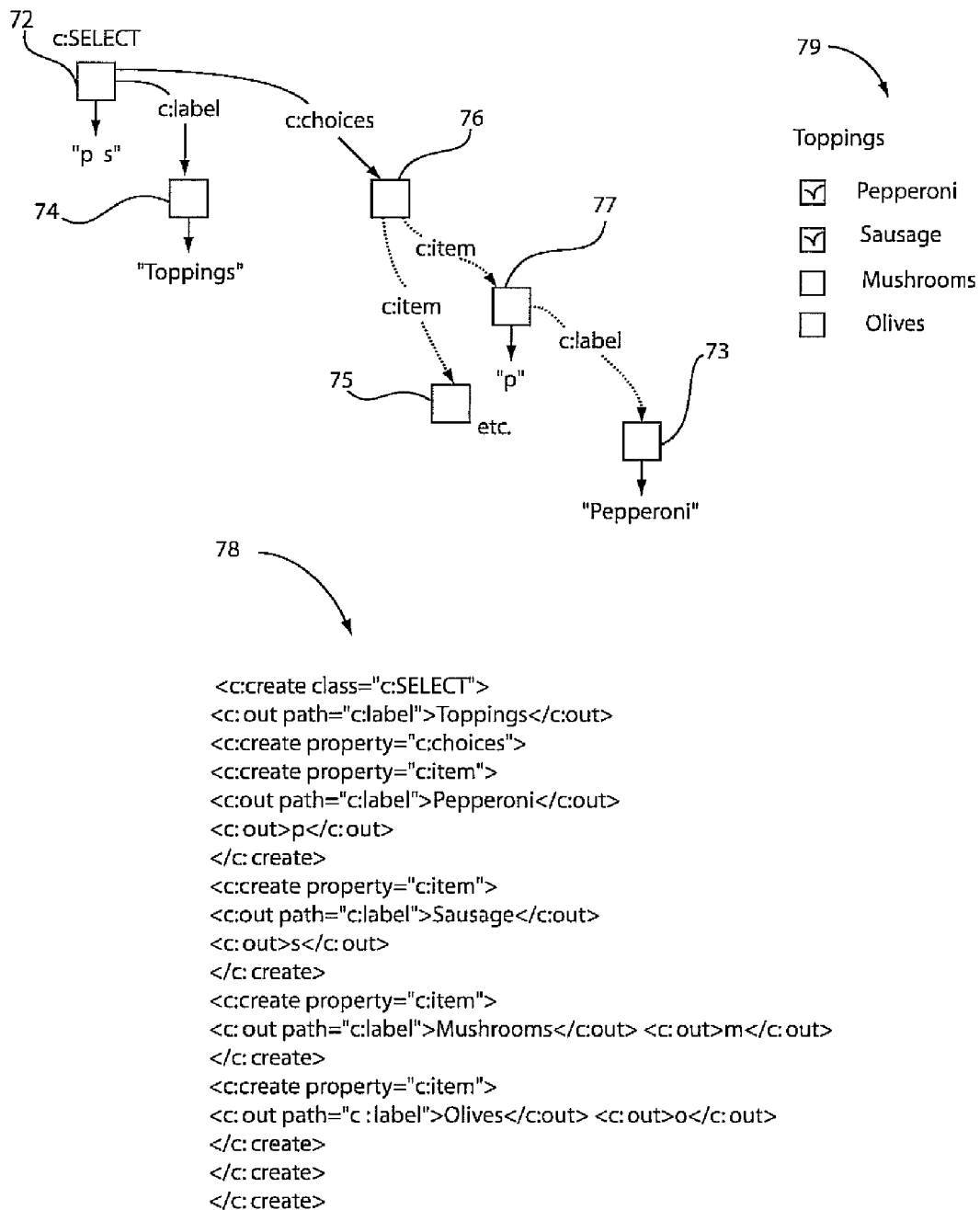
FIG. 7 is a diagram, display and program code demonstrating the use of a c:select primitive in accordance with a declarative programming language (Collage) in accordance with the present principles.
Figure 8:
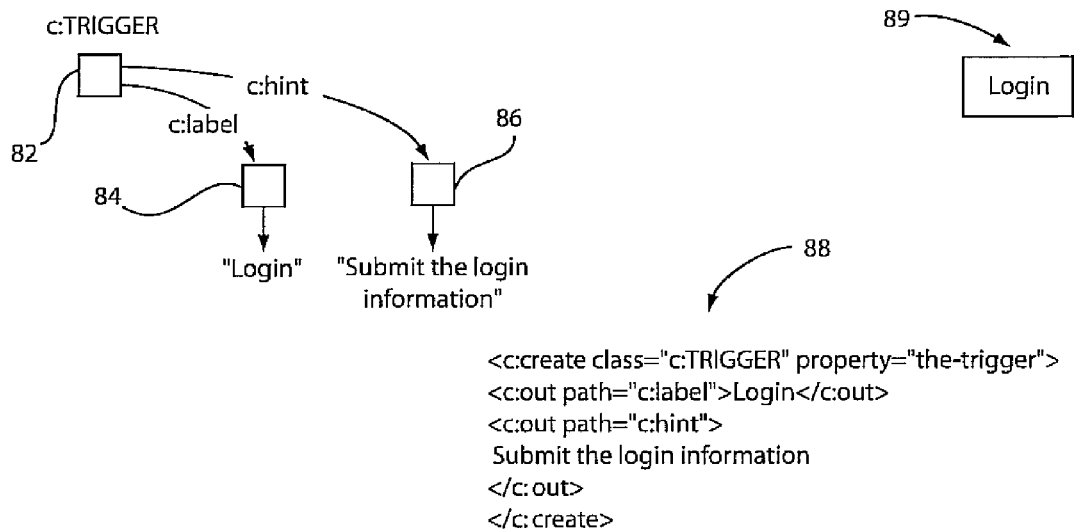
FIG. 8 is a diagram, display and program code demonstrating the use of a c:trigger primitive in accordance with a declarative programming language (Collage) in accordance with the present principles.

In accordance with FIG. 2, a c:INPUT primitive represents a simple one-line input field. A c:INPUT primitive includes three resources: 1) The c:INPUT resource. The value of the c:INPUT resource at all times represents the current value of the input field as seen by the user. Thus the value associated with the c:INPUT resource initially represents the default value of the input field, and subsequently represents the response from the user for this unit of interaction. 2) A dependent resource connected to the c:INPUT resource by a c:label predicate. The value associated with the label resource is to be presented to the user to indicate what response is desired for this unit of interaction. 3) A dependent resource connected to the c:INPUT resource by a c:hint predicate. The value associated with the hint resource is to be presented to the user when the user desires further information for this unit of interaction.

c:TEXTAREA:

Referring to FIG. 3, a c:TEXTAREA primitive represents a multi-line input field. A c:TEXTAREA primitive includes three resources: 1) The c:TEXTAREA resource 32. The value of the c:TEXTAREA resource at all times represents the current value of the input field as seen by the user. Thus, the value associated with the c:TEXTAREA resource initially represents the default value of the textarea field, and subsequently represents the response from the user for this unit of interaction. 2) A dependent resource 34 connected to the c:TEXTAREA resource by a c:label predicate. The value associated with the label resource is to be presented to the user to indicate what response is desired for this unit of interaction. 3) A dependent resource 36 connected to the c:TEXTAREA resource by a c:hint predicate. The value associated with the hint resource is to be presented to the user when the user desires further information for this unit of interaction. A display 39 of the text area and accompanying code 38 are shown.

c:SECRET:

Referring to FIG. 4, a c:SECRET primitive represents an input field designed to collect information that should not be echoed in a readable form, such as a password. A c:SECRET primitive includes three resources: 1) The c:SECRET resource 42. The value of the c:SECRET resource at all times represents the current value of the input field as seen by the user. Thus the value associated with the c:SECRET resource initially represents the default value of the secret field, and subsequently represents the response from the user for this unit of interaction. 2) A dependent resource 44 connected to the c:SECRET resource by a c:label predicate. The value associated with the label resource is to be presented to the user to indicate what response is desired for this unit of interaction. 3) A dependent resource 46 connected to the c:SECRET resource by a c:hint predicate. The value associated with the hint resource is to be presented to the user when the user desires further information for with this unit of interaction. A display 49 of the secret and accompanying code 48 are shown.

c:OUTPUT:

Referring to FIG. 5, a c:OUTPUT primitive presents a string to the user. A c:OUTPUT primitive includes three resources: 1) The c:OUTPUT resource 52. The value of the c:OUTPUT resource represents the information presented to the user. 2) A dependent resource 54 connected to the c:OUTPUT resource by a c:label predicate. The value associated with the label resource is to be presented to the user to optionally qualify the information presented to the user. 3) A dependent resource 56 connected to the c:OUTPUT resource by a c:hint predicate. The value associated with the hint resource is to be presented to the user when the user desires further information for this unit of interaction. A display 59 of the output and accompanying code 58 are shown.

c:SELECT1:

Referring to FIG. 6, a c:SELECT1 primitive presents the user with a set of choices, and allows the user to select one of the choices. A c:SELECT1 primitive includes four resources: 1) The c:SELECT1 resource 62. The value of the c:SELECT1 resource at all times represents the current value of the select field as seen by the user. Thus, the value associated with the c:SELECT1 resource initially represents the default value of the select field, and subsequently represents the response from the user for this unit of interaction. 2) A dependent resource 64 connected to the c:SELECT1 resource by a c:label predicate. The value associated with the label resource is to be presented to the user to indicate what response is desired for this unit of interaction. 3) A dependent resource (not shown) connected to the c:SELECT1 resource by a c:hint predicate. The value associated with the hint resource is to be presented to the user when the user desires further information for with this unit of interaction. 4) A dependent resource 67 connected to the c:SELECT1 resource by a c:choices predicate. This dependent resource is connected to the individual item resources 65 by a c item predicate. Each item resource describes one choice for the c:SELECT1 primitive. The value of the c:SELECT1 resource is at all times the value of the item resource chosen by the user at that time. Each item resource has a dependent resource 61 connected to the item resource by a c:label predicate. The value associated with this label resource is to be presented to the user to indicate what is being chosen by selecting the item. A display 69 of the selections and accompanying code 68 are shown.

c:SELECT:

Referring to FIG. 7, a c:SELECT primitive presents the user with a set of choices, and allows the user to select any number of the choices. A c:SELECT primitive includes four resources: 1) The c:SELECT resource 72. The value of the c:SELECT resource at all times represents the current value of the select field as seen by the user. Thus the value associated with the c:SELECT resource initially represents the default value(s) of the select field, and subsequently represents the response from the user for this unit of interaction. 2) A dependent resource 74 connected to the c:SELECT resource by a c:label predicate. The value associated with the label resource is to be presented to the user to indicate what response is desired for this unit of interaction. 3) A dependent resource connected to the c:SELECT resource by a c:hint predicate. The value associated with the hint resource is to be presented to the user when the user desires further information for this unit of interaction. 4) A dependent resource 76 connected to the c:SELECT resource by a c:choices predicate. This dependent resource is connected to the individual item resources by a c:item predicate. Each item resource describes one choice for the c:SELECT primitive. The value of the c:SELECT resource is at all times the collection of the values of all the item resources 78 chosen by the user at that time. Each item resource has a dependent resource 73 connected to the item resource by a c:label predicate. The value associated with this label resource is to be presented to the user to indicate what is being chosen by selecting the item. A display 79 of the selections and accompanying code 78 are shown.

c:TRIGGER:

Referring to FIG. 8, a c:TRIGGER primitive includes three resources: 1) The c:TRIGGER resource 82. 2) A dependent resource 84 connected to the c:TRIGGER resource by a c:label predicate. The value associated with the label resource is to be presented to the user to indicate what response is desired for this unit of interaction. 3) A dependent resource 86 connected to the c:TRIGGER resource by a c:hint predicate. The value associated with the hint resource is to be presented to the user when the user desires further information for with this unit of interaction. A display 89 of a trigger and accompanying code 88 are shown.

Presentation Layout:

c:TOP: A c:TOP classification represents a top level user interface window. This includes: 1) The c:TOP resource. 2) A dependent resource connected to the c:TOP resource by a c:label predicate. The value associated with the label resource is to be presented to the user as the title for the top level window. The interaction units contained in this top level user interface window are connected to the c:TOP resource by c:contains predicates.

Example code for c:TOP includes:

```
<c:create anchor="c:TOP" property="c:contains" class="c:OUTPUT">
<c:out>Hello World!</c:out>
</c:create>
``` c:HBOX:

A c:HBOX classification represents a horizontal flow layout container. The interaction units laid out in this horizontal flow are connected to the c:HBOX resource by c:contains predicates.

Example code for c:HBOX includes:

```
<c:create anchor="c:HBOX">
  <c:create property="c:contains" class="c: INPUT">
    <c:out path="c:label">Username</c:out>
  </c:create>
  <c:create property="c:contains" class="c:SECRET">
    <c:out path="c:label">Password</c:out>
  </c:create>
  <c:create property="c:contains" class="c:TRIGGER">
    <c:out path="c:label">Login</c:out>
  </c:create>
</c:create>
``` c:VBOX: A c:VBOX classification represents a vertical flow layout container. The interaction units laid out in this vertical flow are connected to the c:VBOX resource by c:contains predicates.

Example code for c:VBOX includes:

```
<c:create anchor="c:VBOX">
  <c:create property="c:contains" class="c: INPUT">
    <c:out path="c:label">Username</c:out>
  </c:create>
  <c:create property="c:contains" class="c:SECRET">
    <c:out path="c:label">Password</c:out>
  </c:create>
  <c:create property="c:contains" class="c:TRIGGER">
    <c:out path="c:label">Login</c:out>
  </c:create>
</c:create>
``` c:GRID: A c:GRID classification represents a tabular grid layout container. A c:GRID is used to display a series of records. When each record is displayed horizontally, as a row, the grid is said to be row-major. A row-major grid includes: 1) The c:GRID resource. 2) A dependent c:ROWS resource, connected to the c:GRID resource by a c:contains predicate. 3) Any number of c:ROW resources, connected to the c:ROWS resource by c:contains predicates. 4) An equal number of interaction units connected to each c:ROW resource by c:contains predicates.

Example code for c:GRID includes:

```
<c:create class="c:GRID">
    <c:create property="c:contains" class="c:ROWS">
        <c:create property="c:contains" class="c:ROW">
            <c:create property="c:contains" class="c:OUTPUT">
                <c:out>New York</c:out>
            </c:create>
        <c:create property="c:contains" class="c:OUTPUT">
        <c:out>64</c:out>
        </c:create>
            </c:create>
        <c:create property="c:contains" class="c:ROW">
        <c:create property="c:contains" class="c:OUTPUT">
            <c:out>San Francisco</c:out>
        </c:create>
        <c:createproperty="c:contains" class="c:OUTPUT">
            <c:out>71</c:out>
        </c:create>
        </c:create>
        <c:create property="c:contains" class="c:ROW">
        <c:create property="c:contains" class="c:OUTPUT">
        <c:out>Chicago</c:out>
        </c:create>
        <c:create property="c:contains" class="c:OUTPUT">
        <c:out>61</c:out>
        </c:create>
        </c:create>
        </c:create>
        </c:create>
```

When each record is displayed vertically, as a column, the grid is said to be column-major. A column-major grid includes: 1) The c:GRID resource. 2) A dependent c:COLUMNS resource, connected to the c:GRID resource by a c:contains predicate. 3) Any number of c:COLUMN resources, connected to the c:COLUMNS resource by c:contains predicates. 4) An equal number of interaction units connected to each c:COLUMN resource by c:contains predicates.

Example code for c:GRID includes:

```
<c:create class="c:GRID">
    <c:create property="c:contains" class="c:COLUMNS">
        <c:create property="c:contains" class="c:COLUMN">
            <c:create property="c:contains" class="c:OUTPUT">
        <c:out>New York</c:out>
        </c:create>
        <c:create property="c:contains" class="c:OUTPUT">
        <c:out>64</c:out>
        </c:create>
    </c:create>
<c:create property="c:contains" class="c:COLUMN"> <c:create property="c:contains"
    class="c:OUTPUT"> <c:out>San Francisco</c:out>
</c:create>
<c:create property="c:contains" class="c:OUTPUT">
    <c:out>71</c:out>
</c:create>
</c:create>
<c:create property="c:contains" class="c:COLUMN"> <c:create property="c:contains"
    class="c:OUTPUT">
    <c:out>Chicago</c:out>
</c:create>
<c:create property="c:contains" class="c:OUTPUT">
    <c:out>61</c:out>
</c:create>
</c:create>
</c:create>
</c:create>
```

The set of built-in primitives provides a basis for a portable user interface definition, but is by no means the complete set of user interface elements. Indeed, an application may declaratively specify an additional set of resource classifications for other abstract user interface elements. These may be at the same user interface granularity as the built-in primitives, or be aggregations thereof. Furthermore, such classifications need to be declaratively specified once and may become reusable assets for many applications. The next section describes how this may be done in accordance with the present principles by defining composite abstract interaction units.

Composite abstract interaction units: An abstract interaction unit definition includes of the following elements as described and depicted in FIG. 1: 1) A model resource class that serves as an anchor class for the other elements of the definition. 2) A view, or set of subordinate interaction units, comprising the dependent structure of the abstract interaction unit. 3) A controller, defined by a set of program constructs such as <c:bind> that associate reactive behavior connecting the models of the composite interaction units and the subordinate interaction units.

Composite interaction units are built by aggregating existing abstract interaction units (either composite or primitive), while assigning them composite semantics. This process recurses uniformly to enable building interaction units that can abstractly specify larger units of interaction, potentially presenting many pieces of information to the user and collecting multiple responses from the user. For example, consider the unit of interaction for collecting calendar dates from a user. This could be defined as a new interaction unit whose model resource has class YMD. Associated with the YMD resource are three c:INPUT primitives, collecting the year, month and date respectively, as shown below in the illustrative code:

```
<c:with anchor="YMD">
<c:create class="c:INPUT" ref="yr"
property="yr-field">
<c:out path="c:label">year</c:out>
</c:create>
    <c:create class="c:INPUT" ref="mo" property="mo-field">
        <c:out path="c:label">month</c:out>
    </c:create>
    <c:create class="c:INPUT" ref="day"
property="day-field">
    <c:out path="c:label">day</c:out>
    </c:create>
</c:with>
```

Figure 9:
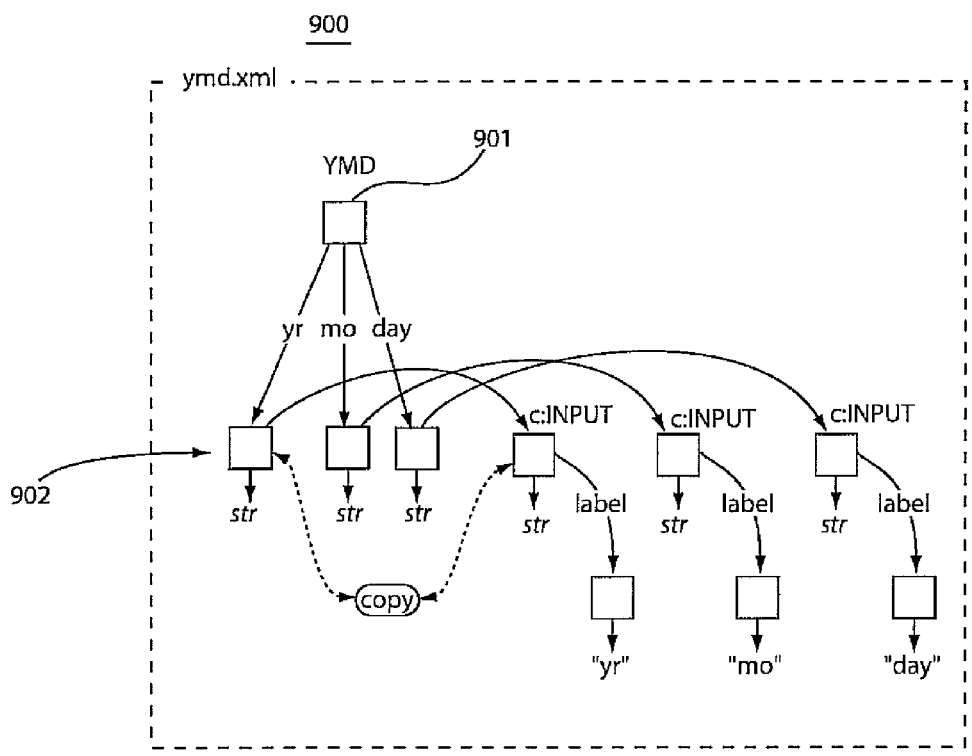
FIG. 9 is a diagram showing a YMD resource with Y, M, D elements which are accessible to other programs in accordance with the present principles.

Referring to FIG. 9, a structure 900 associated with a YMD resource 901 that is created by the code above. FIG. 9 shows that a model 902 for an interaction unit, that is the value of the YMD resource, includes separate elements for each of year, month, and day. This model value is expected to be provided by a user of the component (see example below). The ref attributes on the <c:create> construct bind the values of the c:INPUTs to the corresponding elements of the model, as indicated by the oval labeled "copy".

This application may be an RDF-based MVC abstraction for a user interface design. We can now build on the YMD interaction unit to illustrate recursive composition of reusable abstract inter-action units in applications that need to collect calendar dates. Consider, for example, an application that needs to collect dates in yyyy.mm.dd form. The application can build on the YMD interaction unit to define a new interaction unit, DATE-STRING, by providing tie binds, or transformations, between the model of a calendar date associated with the YMD interaction unit and the model associated with a DATE-STRING interaction unit. This bidirectional transformation is expressed as a pair of binds in the following code:

```
<c:with anchor="DATE-STRING">
<c:create class="YMD" property="ymd"/>
<!-- bind models -->
<c:bind>
   <c:in path="ymd" variable="$in"/>
   <c:out path=".">
   {$in/yr/text( )}.{$in/mo/text( )}.{$in/day/text( )}
   </c:out>
</c:bind>
<c:bind>
   <c:in path="." variable="$in"/>
   <c:out path="ymd">
      <yr>{tokenize($in, '\.')[1]}</yr>
      <mo>{tokenize($in, '\.')[2]}</mo>
      <day>{tokenize($in, '\.')[3]}</day>
   </c:out>
</c:bind>
</c:with>
```

Figure 10:
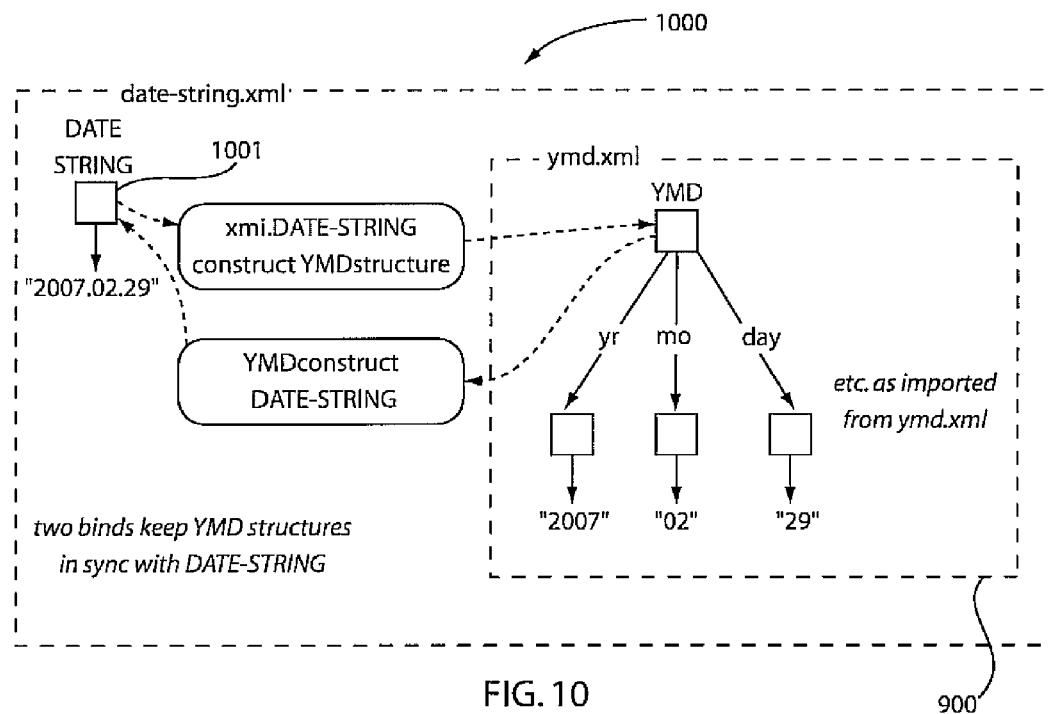
FIG. 10 is a diagram showing how the YMD resource may be employed and reused by a program date-string in accordance with the present principles.

Referring to FIG. 10, a DATE-STRING interaction unit 1001 and its relationship to the previously defined YMD interaction unit are illustratively shown as part of an XML program 1000.

Layout and styling: The abstract interaction primitives and abstract composition units described above are abstract in the sense that they do not provide information about concrete rendering, such as the physical layout of the interaction units on a screen. This section describes the mechanism for overlaying concrete layout and styling information on the abstract interaction mechanism described above. The present embodiments provide a mechanism for describing a layout tree as an overlay on the abstract interaction units. A layout tree includes: 1) a set of resources connected as a tree by the Collage layout containment property c:contains; 2) a root node, such as a c:TOP resource representing a top-level user interaction window; 3) a set of interior nodes which are resources of a layout container class such as the built-in containers c:VBOX, c:HBOX, and c:GRID; and 4) a set of leaf nodes which are resources of one of the abstract interaction primitives described above (c:INPUT, c:OUTPUT, etc.).

The following example illustrates a simple layout tree for a login form. The layout tree is created by the following code:

```
<!-- fill a top-level window with a LOGIN-FORM -->
<c:create anchor="c:TOP" property="c:contains"
   class="LOGIN-FORM"/>
<!-- LOGIN-FORM, including concrete layout information -->
<c:with anchor="LOGIN-FORM">
   <c:let class="c:HBOX">
      <c:create property="c:contains" class="c:VBOX">
         <c:create property="c:contains" class="c: INPUT">
            <c:out path="c:label">Username</c:out>
         </c:create>
         <c:create property="c:contains"
            class="c:SECRET">
            <c:out path="c:label">Password</c:out>
         </c:create>
         <c:create property="c:contains"
            class="c:TRIGGER">
   <c:out path="c:label">Login</c:out>
         </c:create>
      </c:let>
</c:with>
```

Figure 11:
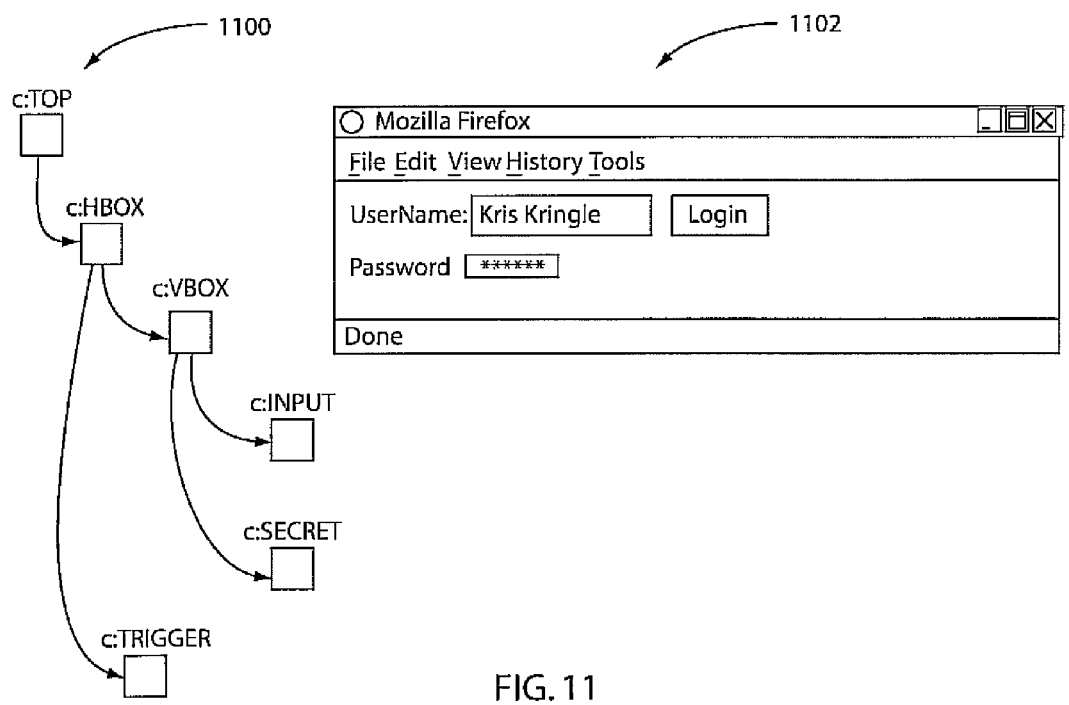
FIG. 11 is diagram showing a layout tree and its presentation.

Referring to FIG. 11, a layout tree 1100 created by the preceding code, and a rendering 1102 of that layout tree in a browser window are illustratively shown. In the layout tree diagram, the c:contains triples are shown as lines.

This layout tree includes: a top-level user interaction window represented by a c:TOP resource, which includes a horizontal flow represented by a c:HBOX resource, which includes a vertical flow represented by a c:VBOX resource, which includes a c:INPUT primitive, and a c:SECRET primitive, and a c:TRIGGER primitive.

The present embodiments provide a set of built-in layout containers: c:TOP, which represents a top-level user interaction window; c:HBOX, which represents a horizontal flow layout; c:VBOX, which represents a vertical flow layout; and c:GRID, which represents a tabular grid layout.

The layout tree 1100 can be specified as an overlay on the abstract user interface to provide a better separation of concerns between the abstract user interface definition and the layout tree and styling information for a concrete rendering of that interface. The following example illustrates such an overlay, and builds on the login form example above.

```
<!-- fill top-level window with a LOGIN-FORM -->
<c:create anchor="c:TOP" property="c:contains"
class="LOGIN-FORM"/>
<!-- define the LOGIN-FORM -->
<c:with anchor="LOGIN FORM">
   <!-- abstract user interface -->
   <c:create class="c:INPUT" property="username"> <c:out
      path="c:label">Username</c:out>
   </c: create>
   <c:create class="c:SECRET" property="password">
      <c:out path="c:label">Password</c:out>
   </c:create>
   <c:create class="c:TRIGGER" property="login">
      <c:out path="c:label">Login</c:out>
   </c:create>
   <!-- concrete layout overlay -->
   <c:let class="c:HBOX">
      <c:create property="c:contains" class="c:VBOX">
         <c:let property="c:contains"
         path="c:contains../username" /> <c:let
         property="c:contains" path="c:contains../password" />
      </c:create>
      <c:let property="c:contains" path="login" />
   </c:let>
</c:with>
```

The LOGIN-FORM interaction unit is specified in terms of: The abstract user interface definition, which contains:
A c:INPUT for the username (username input)
A c:SECRET input for the password (password input), and
A c:TRIGGER to submit the information (login trigger), and
The overlaid layout tree for the interaction unit, which contains:
A horizontal flow represented by a c:HBOX resource, the root of the layout tree for this interaction unit, which contains
A vertical flow represented by a c:VBOX resource, an interior node of the layout tree, which contains:
The username input resource from the abstract user interface definition, a leaf node of the layout tree, and
The password input resource from the abstract user interface definition, a leaf node of the layout tree, and
The login trigger resource from the abstract user interface definition, a leaf node of the layout tree.

The layout tree 1100 for the login form is attached to a top level user interaction window, specified by the c:TOP resource. The separation of concerns between the abstract user interface definition and the layout tree and styling information is carried further in the following example, where the two have been factored into separate resource classifications, which may be defined in the same or different program units, by the same or different developers.

```
<!-- fill top-level window with a LOGIN-FORM -->
<c:create anchor="c:TOP" property="c:contains"
class="LOGIN-FORM"/>
<!-- define the LOGIN-FORM -->
<c:with anchor="LOGIN-FORM">
  <!-- abstract user interface -->
  <c:create class="c:INPUT" property="username">
    <c:out path="c:label">Username</c:out>
  </c:create>
  <c:create class="c:SECRET" property="password"> <c:out
  path="c:label">Password</c:out>
  </c:create>
  <c:create class="c:TRIGGER"
    property="login">
  <c:out path="c:label">Login</c:out>
  </c:create>
  <!-- concrete layout overlay -->
  <c:let class="c:HBOX">
    <c:create property="c:contains" class="c:VBOX">
      <c:let property="c:contains" path="c:contains../username" />
      <c:let property="c:contains" path="c:contains../password" />
    </c:create>
        <c:let property="c:contains" path="login" />
      </c:let>
</c:with>
```

This approach allows for the possibility of specifying different styles for the same LOGIN-FORM, and choosing from among those styles either at the point in the code where the LOGIN-FORM is created (as in this example), or elsewhere in the code. By following this approach we have achieved a separation of concerns between abstract and concrete user interaction specification.

Renderkits: The preceding describes the mechanisms by which a developer defines abstract and concrete elements of a user interface. To present the user interface on any particular device, it must be rendered using a technology that may be specific to the device. A rendered user interface is implemented, in accordance with the present principles, as a refinement of the user interface described using the presentation primitives and layout mechanism described above. The resource classifications necessary for such refinement are defined in a renderkit.

Multiple classification is used to refine each resource classified as a presentation primitive into a resource that also contributes dependent structure and behavior towards the rendered user interface. The dependent structure and behavior are declaratively specified in the renderkit using <c:create> and <c:bind> constructs respectively.

The structure and behavior of the rendered user interface may be specific to a particular rendering technology. This may be accommodated by providing renderkits that are suitable to each rendering technology, such as (X)HTML, XUL, WML, VoiceXML, and so on. Since any given renderkit embodies just one approach to rendering for a particular technology, it is possible that there may be any number of renderkits for a given user interface technology. Each such renderkit might for example provide a different look and feel. It is also possible that a rendered user interface may be formed by combining features, such as resource classifications, from more than one renderkit.

Figure 12:
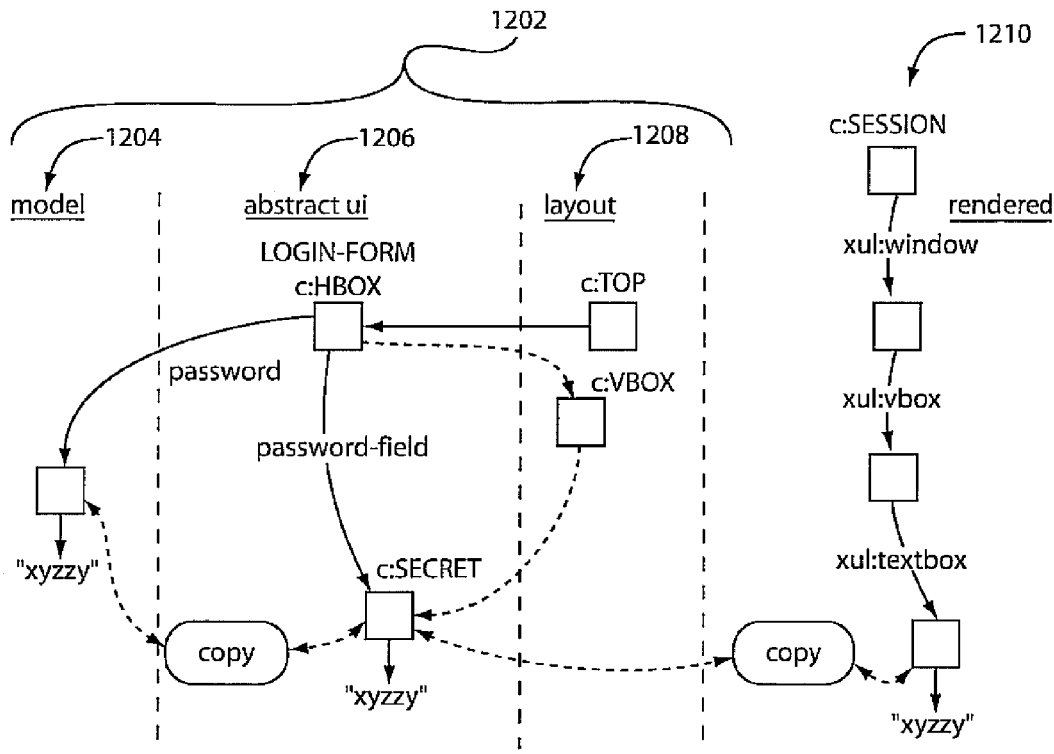
FIG. 12 is a diagram showing relationships between a model, abstract interface, layout and a renderkit in accordance with the present principles.

Referring to FIG. 12, an illustrative diagram shows relationships between resources that are created by code that a typical application developer writes in area 1202, a model 1204, an abstract user interface (UI) 1206, and a layout 1208; and resources that are created by a renderkit 1210, which most developers need not be concerned with. It is anticipated that most developers will not need or want to author a renderkit, but rather will use a pre-existing renderkit, such as a system-provided renderkit(s). However, it is possible that advanced developers might want to author a renderkit using the present programming model.

Each example is accompanied by a static screen shot of the example. This section introduces the present programming model through two examples that represent opposite extremes. The first example, the traditional "Hello World", illustrates a minimal program for displaying a string to a user. The second example illustrates a complete (albeit minimal) end-to-end, potentially distributed, program that allows a user to view and modify information stored in a back-end database.

Figure 13:
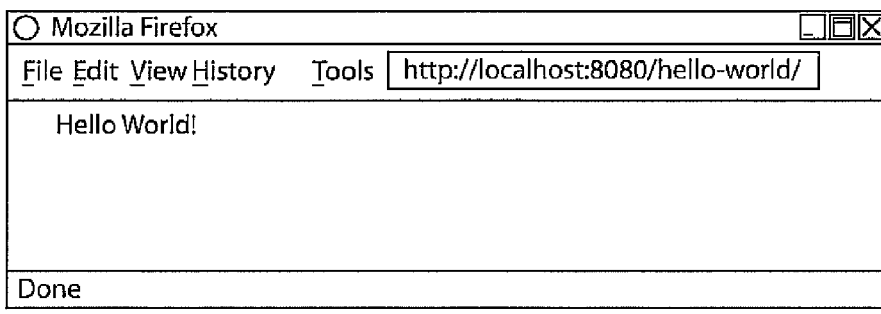
FIG. 13 is a display output of the diagram shown in FIG. 14.
Figure 14:
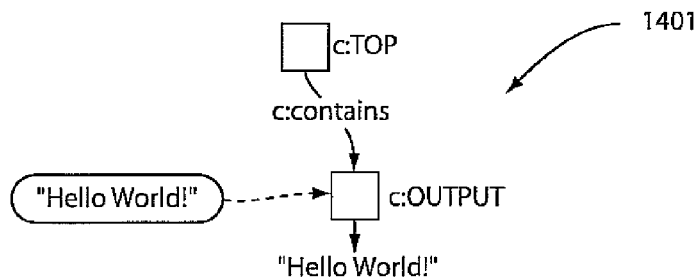
FIG. 14 is a diagram showing an example for showing static text in accordance with the present principles.

Referring to FIG. 13, a rendering 1301 of static text is shown. This example shows the simplest way to display static text. In keeping with the tradition for "Hello World" examples, it uses the most direct and concrete approach, embodying application logic, abstract user interface, layout, and styling all in one minimal set of resources, classifications, and triples. In later examples we will see how the present language allows these aspects of an application to be separated in a manner that promotes reuse and flexibility. In FIG. 14, a diagram 1401 illustrates the data structures and executable binds created by the code below.

```
<c:unit xmlns:c="urn:collage/">
  <c:import unit="!basic-ui.xml"/>
<c:create anchor="c:TOP" property="c:contains" class="c:OUTPUT">
      <c:out>Hello World!</c:out>
    </c:create>
  </c:unit>
```

In FIG. 14, Collage runtime automatically creates, for every new browser session, a new resource of class c:TOP, representing the top-level browser window for the session. The class c:TOP and associated behavior is defined by the Collage system, as indicated by its c:namespace prefix.

The hello-world application uses a <c:create> construct to create a c:OUTPUT resource and connect it to the c:TOP resource with a triple that has the c:contains property. The c:OUTPUT class is defined by Collage and represents an abstract user interaction primitive that presents a string to the user. The c:contains property is defined by Collage and indicates that the c:OUTPUT user interaction primitive is contained in the c:TOP window. The <c:out> construct provides an initial value for the c:OUTPUT resource created by the enclosing <c:create> construct. The initial value consists of the constant string "Hello World!". The <c:out> construct is an example of a Collage bind, which is notated as an oval containing the bind expression.

Building an end-to-end application: This example is a simple end-to-end Collage application that provides a form (1) that allows querying and updating a database of weather information (2). It illustrates how a single declarative data and execution model is used uniformly through all tiers of a distributed application. This example briefly illustrates the use of three of the primary constructs of Collage: <c:create>, <c:let>, and <c:bind>. This example is intended just to show the scope and form of a complete end-to-end Collage application; the specific constructs used in the example will be explained in more detail by subsequent examples.

Figure 15:
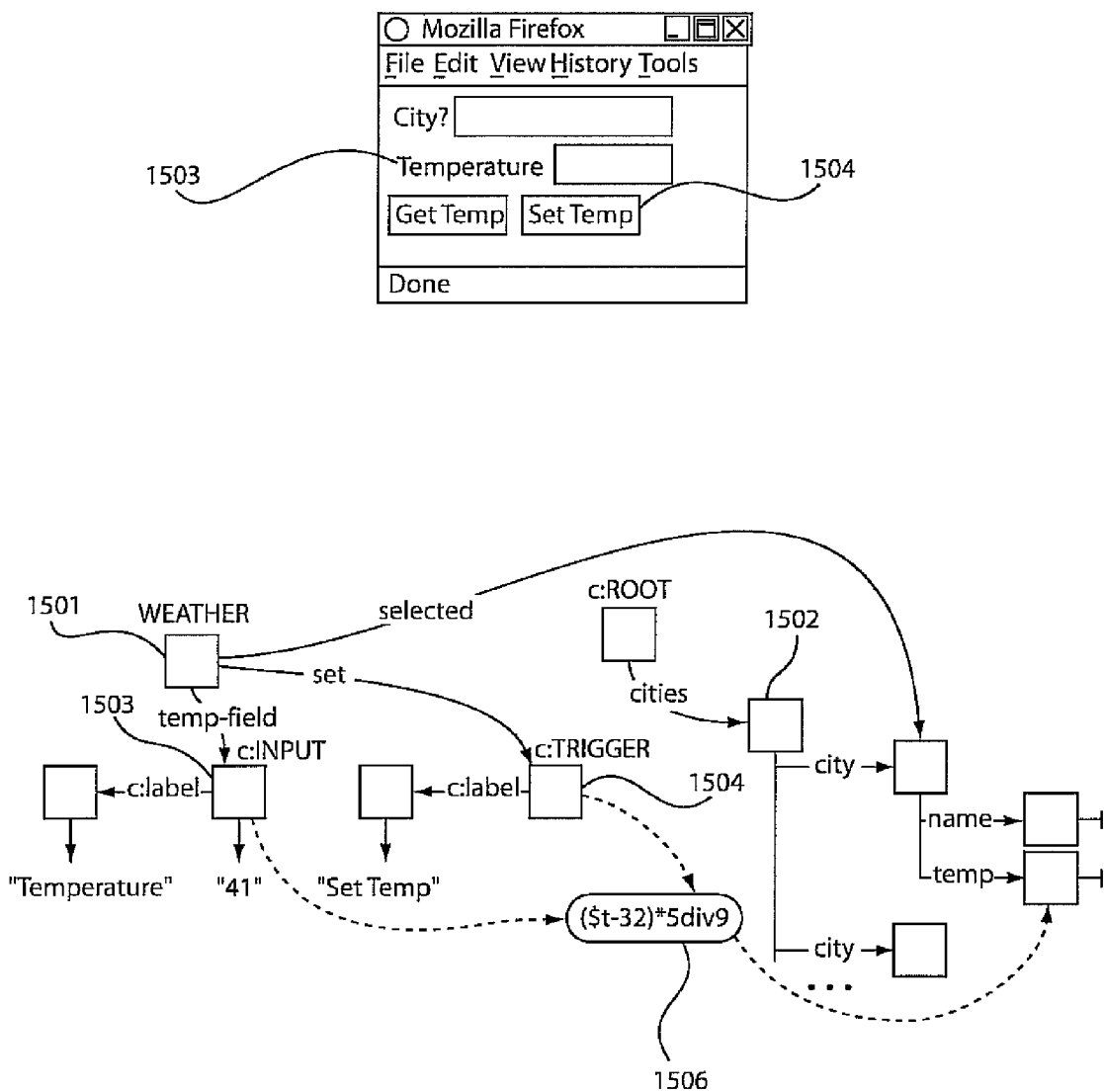
FIG. 15 is a diagram and display demonstrating the use of a c:create, c:let and c:bind constructs in accordance with a declarative programming language (Collage) in accordance with the present principles.

Referring to FIG. 15, a <c:create> construct is used to create and associate user interface elements such as inputs 1503 and triggers 1504 with a WEATHER resource class 1501 that represents the form:

```
<c:with anchor="WEATHER">
<c:create class="c: INPUT" property="city-field">
<c:out path="c:label">City?</c:out>
    </c:create>
<c:create class="c:INPUT" property="temp-field">
        <c:out path="c:label">Temperature:</c:out>
</c:create>
<c:create class="c:TRIGGER" property="get">
        <c:out path="c:label">Get Temp</c:out>
</c:create>
<c:create class="c:TRIGGER" property="set">
        <c:out path="c:label">Set Temp</c:out>
</c:create>
</c:with>
```

A <c:let> construct uses the city-field input field to select a row from the database, recording it using the selected property:

```
<c:let
anchor="WEATHER"
property="selected"
path="/cities/city[name/text( )=$anchor/city-field/text( )]"/>
```

A <c:bind> construct 1506, triggered by the set trigger 1504, updates the database with the quantity in the temperature input field, after converting Fahrenheit to Celsius. A similar <c:bind> construct retrieves the temperature from the database, converting Celsius to Fahrenheit.

```
<c:bind anchor="WEATHER">
<c:in path="set"/>
        <c:in path="temp-field" variable="$temp" version="old"
        passive="true"/>
        <c:out path="selected/temp">
        {($temp − 32) * 5 div 9}
        </c:out>
</c:bind>
```

FIG. 15 gives no indication of the physical distribution of computing components, and the application code is largely independent of that. A typical deployment scenario is illustrated by FIG. 16, where the dashed boxes represent computing nodes.

Figure 16:
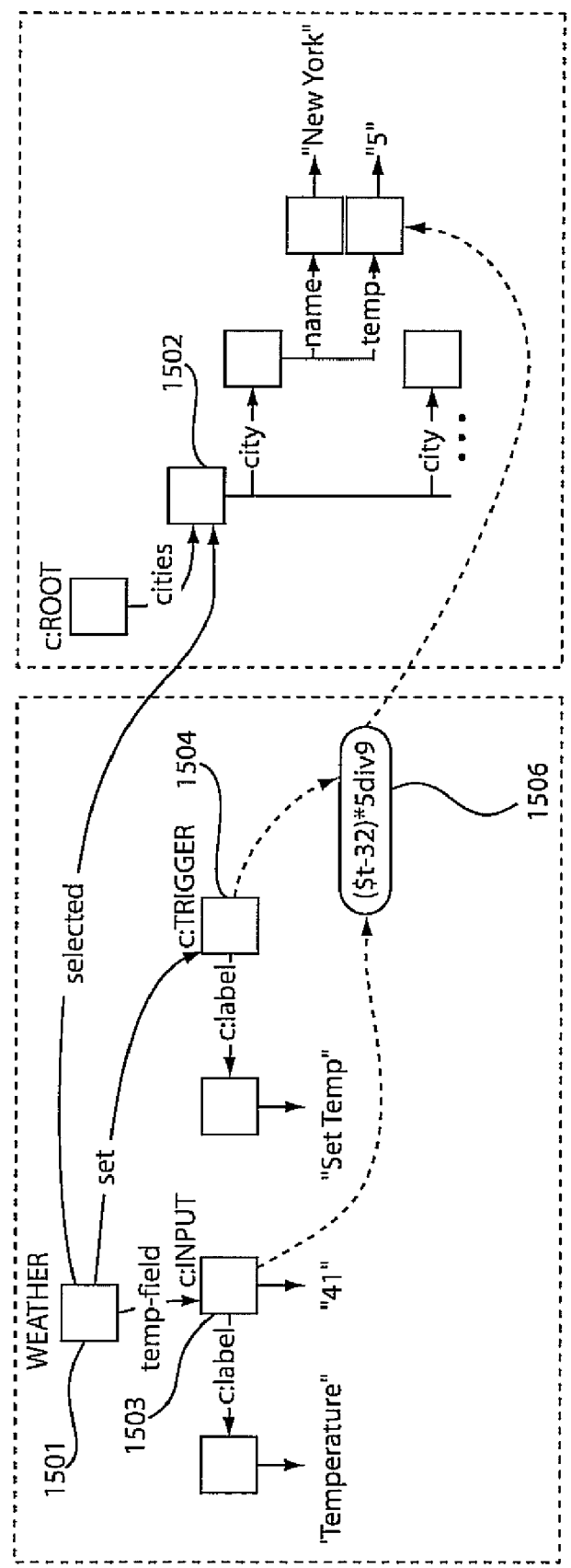
FIG. 16 is a diagram and display demonstrating the use of the constructs and structure of FIG. 15 across two programming nodes.

Referring to FIG. 16 with continued reference to FIG. 15, a database 1502 and a user interface 1501 might be provided by different computing nodes, that is, different Collage services. In this case the selected triple connecting the form to the database would create a distributed data structure, and the <c:bind> 1506 that updates the database would represent distributed program execution.

Language basics: This section introduces basic concepts of Collage including, e.g., how to create resources, how to classify resources, how to connect resources with triples, how to assign values to resources, how to locate data using XPath, and how respond to value updates using bind.

Using bind to connect an input directly to an output: The example shown in FIG. 17 shows how to create a c:INPUT resource and a c:OUTPUT resource, and connect their values using a <c:bind> construct. The resources are created using the <c:create> construct, specifying a class for the newly created resources, and the name of a property used to connect the resources to their anchor resource (identified as c:TOP). Every character typed into the input field generated by the c:INPUT resource cause the value of the c:INPUT resource to be updated, which triggers the execution of the <c:bind> construct. The <c:bind> copies the value of the c:INPUT to the c:OUTPUT.

```
<!-- input field -->
<c:create class="c:INPUT" property="in-field"/>
<!-- output field -->
<c:create class="c:OUTPUT" property="out-field"/>
<!-- copy in-field to out-field whenever in-field changes -->
<c: bind>
    <c:in path="in-field" variable="$input"/>
    <c:out path="out-field">{$input}</c:out>
</c:bind>
</c:with>
```

This example illustrates a simple pattern in which an input is connected directly to an output. In subsequent examples, a more reusable pattern will be seen in which the constituent component models (the c:INPUT and c:OUTPUT values in this example) are connected via an additional data model specific to the aggregating component (represented by the c:TOP resource in this example).

Using a trigger to control bind execution: In FIG. 18, another example similar to the previous one in that it creates a c:INPUT whose value is copied to a c:OUTPUT is shown. However, unlike the previous example in FIG. 17, the c:OUTPUT is not updated on every keystroke. Text that is entered to the c:INPUT will be accumulated by the c:INPUT but will not trigger the execution of the <c:bind> because that input to the bind is marked passive. The c:TRIGGER resource is displayed as a button 1801, and pressing that button 1801 will cause the c:TRIGGER resource to be updated, which will trigger the execution of the <c:bind> because the c:TRIGGER resource is an active input to the <c:bind>. The <c:bind> then copies the value of the c:INPUT resource to the c:OUTPUT resource.

```
<c:with anchor="c:TOP">
<!-- input field -->
<c:create class="c: INPUT" property="in-field"/>
<!-- output field -->
<c:create class="c:OUTPUT" property="out-field"/>
<!-- trigger -->
<c:create class="c:TRIGGER" property="the-trigger">
<!-- copy in-field to out-field whenever trigger is pressed -->
<c: bind>
    <c:in path="in-field" variable="$input" passive="true"/>
    <c:in path="the-trigger"/>
    <c:out path="out-field">{$input}</c: out>
</c:bind>
</c:with>
```

Figure 19:
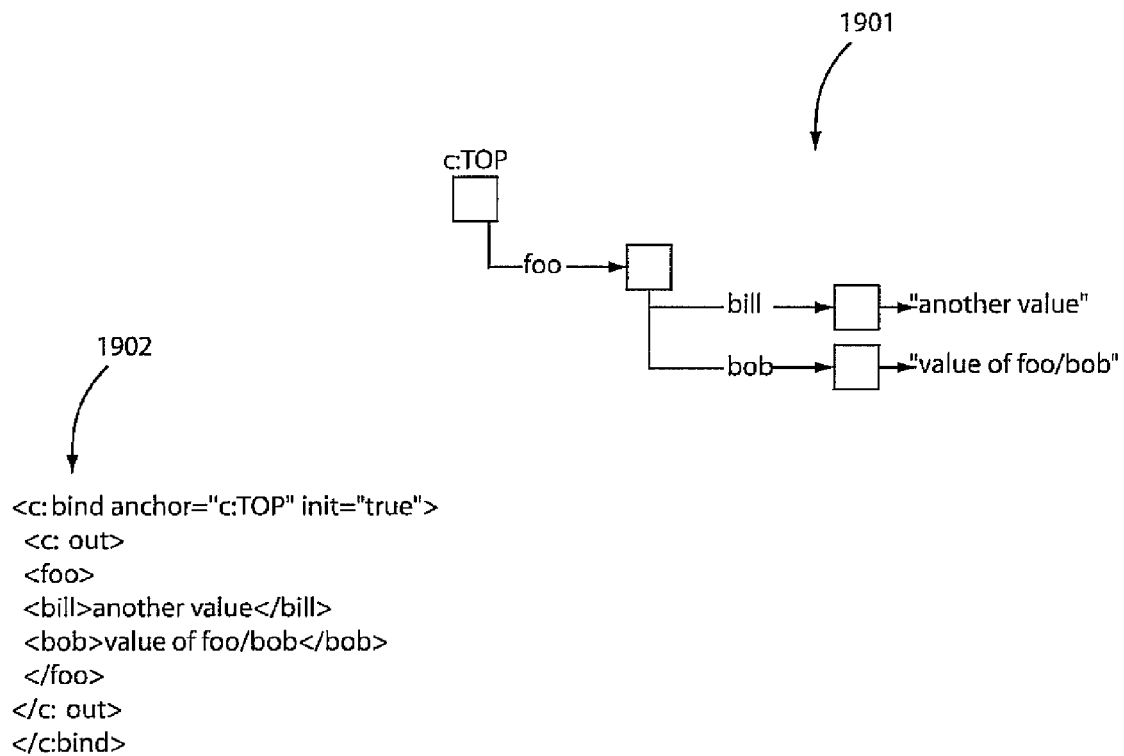
FIG. 19 is a diagram and code demonstrating the use of a c:bind construct to initialize a value of a resource in accordance with the present principles.

Using bind to initialize the value of a resource: Referring to FIG. 19, another example shows how a newly created resource may be initialized using a bind. In the previous examples, binds were triggered by an update to the value of an input. In this example the bind has no inputs, and its execution is triggered by creation of its output resource. In this simple example the content of <c:bind> is a <c:out> which contains an XML structure 1902 representing the initial value of the resource that it targets, which is called its anchor resource, identified by its class c:TOP. The result is that the anchor resource is initialized with the value shown in FIG. 19, represented as an RDF value tree 1901.

Thus we have seen that any bind may be triggered by an update to one of its input resources, provided that that input resource is marked passive="false" (which is the default value if the passive attribute is not specified); or the creation of its output resource, provided that the bind is marked init="true".

Running this example produces no output in the browser, because the example does not bind the data to any user interface resources. You can observe the execution of the bind by viewing the console debug log.

Figure 20:
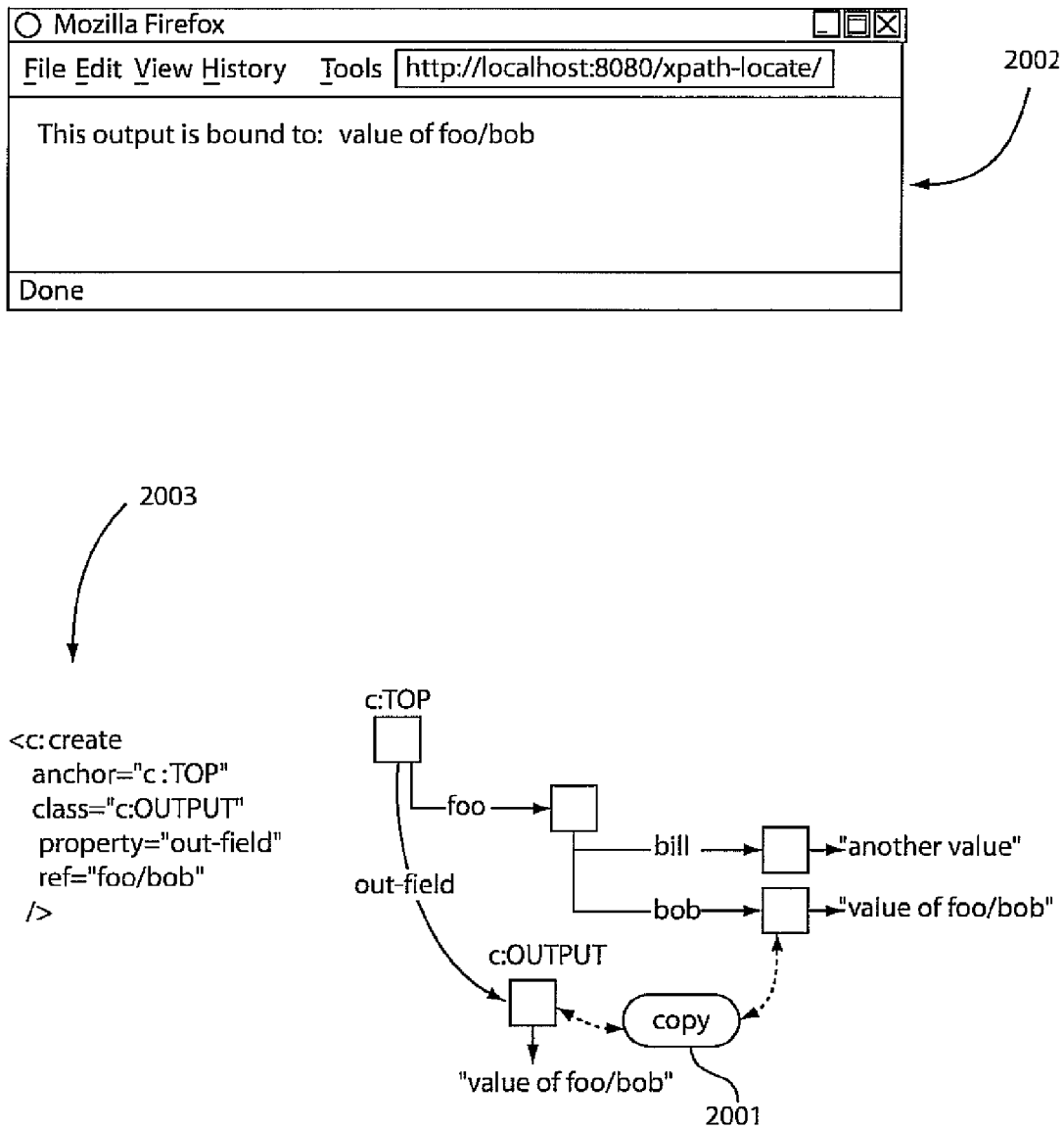
FIG. 20 is a diagram, display and code demonstrating the use of XPATH to locate data in a model in accordance with the present principles.

Using XPath to locate data in a model: Referring to FIG. 20, this example shows how to locate data within a data structure using XPath. The data structure is first created with an initializing <c:bind>, as described in the previous example. The example then creates a c:OUTPUT resource to display the data. The ref attribute of the <c:create> binds the c:OUTPUT resource to the data that should be displayed and/or modified, as indicated by an oval 2001 marked "copy" in FIG. 20. The value of the ref attribute is an XPath expression that selects the data to be operated on. In this case, the expression is foo/bob, which means to first navigate from the anchor resource via a triple with property foo and then via a triple with property bob, arriving at the resource whose value in this example is "value of foo/bob".

The function of the ref attribute is to bind the value of the resource identified by the XPath expression to the value of the resource created by the <c:create> construct that contains the ref attribute. Thus, the value of the foo/bob resource has been copied to the c:OUTPUT resource, which causes it to be displayed in a browser 2002. Code 2003 is shown for implementing this.

Figure 21:
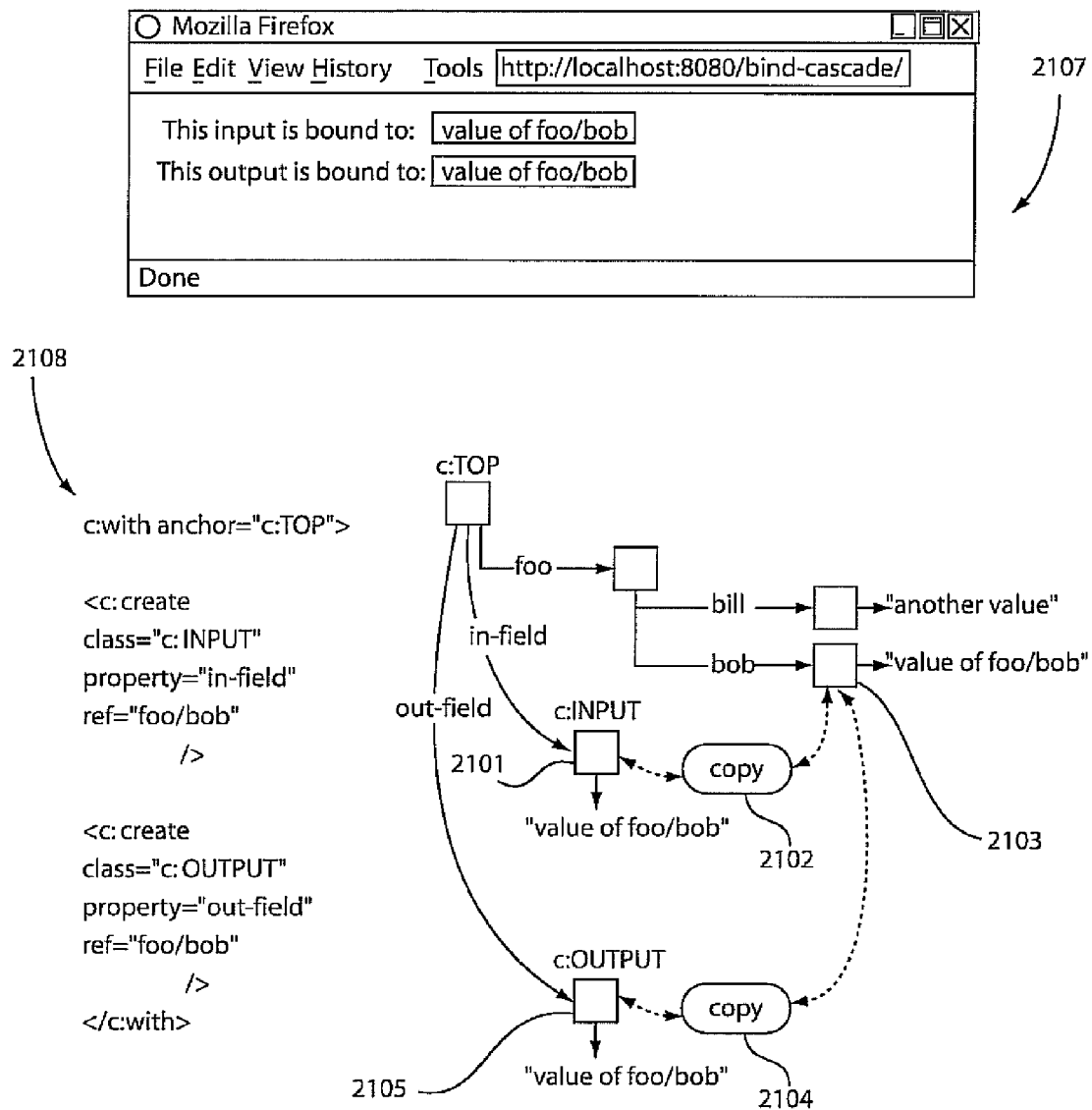
FIG. 21 is a diagram, display and code demonstrating cascading bind constructs in accordance with the present principles.

Cascading binds: Referring to FIG. 21, this example shows how two or more binds may be cascaded, so that the resource value update that results from the execution of one bind triggers die execution of another bind, and so on. This example, like the previous example, creates a data structure, initializes it, and binds a c:OUTPUT to a portion of the data structure to display it. In addition, this example creates and binds a c:INPUT to the same portion of the data structure, al lowing the user to modify the value of that part of the data structure. The ref attributes of each <c:create> bind die c:INPUT resource and the c:OUTPUT resource respectively to the data that should be displayed and/or modified, as indicated by the ovals marked "copy" in FIG. 21.

When the user types into the entry field, the value of the corresponding c:INPUT resource 2101 is updated. This results in the execution of the bind 2102 which updates the resource 2103. The update of the resource 2103 triggers the execution of the bind 2104, causing an update of the c:OUTPUT resource 2105, which is displayed to the user. Code 2108 and a rendering 2107 of the output are shown.

User interaction basics: This section introduces the basics of the Collage user interaction model, including primitive abstract units of interaction, concrete screen layout, modular design of user interfaces, and screen flow.

Figure 22:
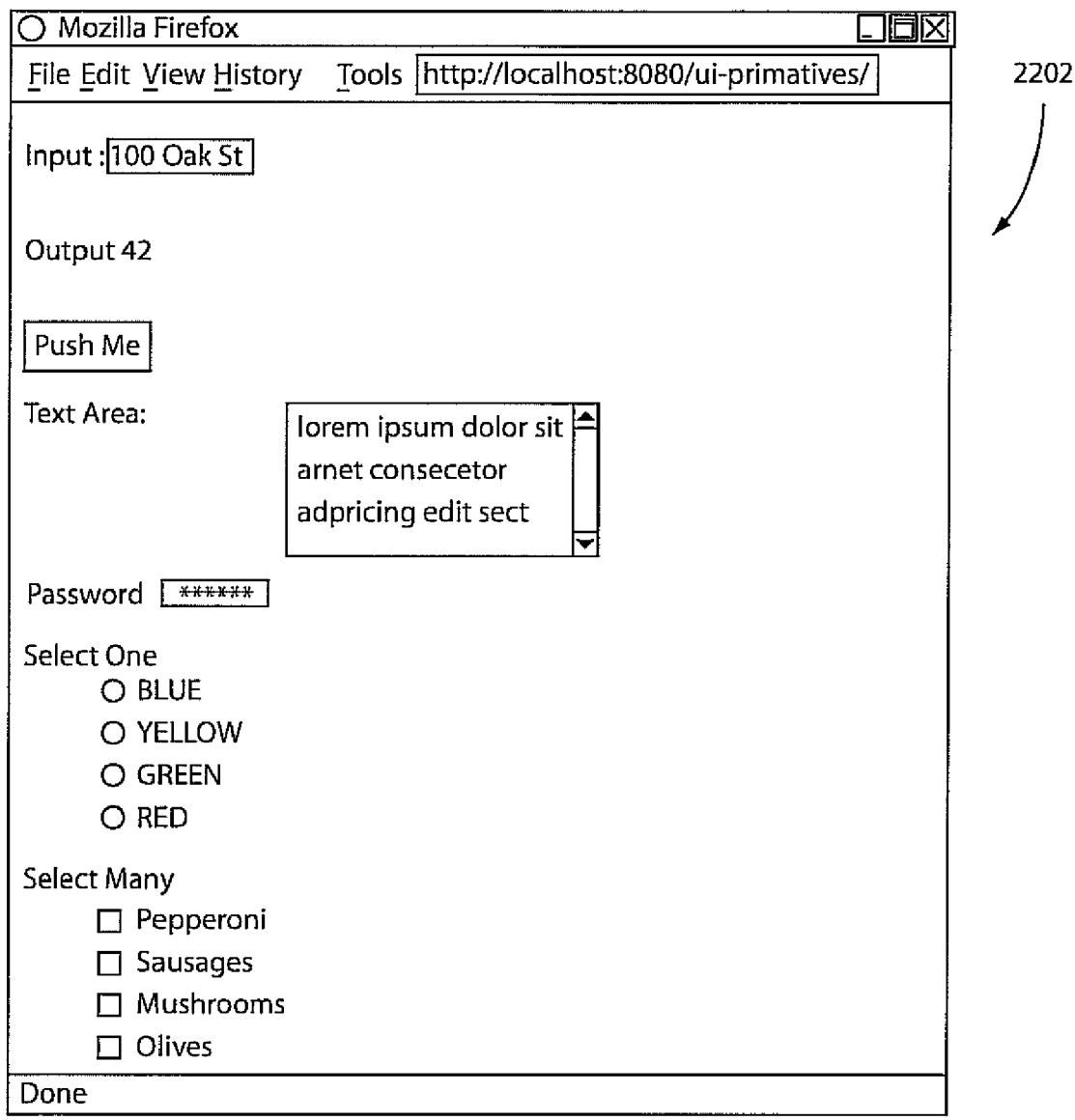
FIG. 22 is a display for demonstrating user interaction primitives in accordance with the present principles.

Using abstract user interaction primitives: Referring to FIG. 22, this example surveys abstract user interaction primitives defined by Collage. The interaction primitives themselves are abstract in the sense that their semantics is primarily focused on behavior, and their appearance as rendered on a screen rendering 2202 is specified only in general terms. For example, C:SELECT1 specifies that a set of choices will be presented to the user, and the user will be provided with a means of selecting one of those choices. This primitive might be rendered in any number of ways: as a set of radio buttons, as a selection list as a selection dropdown, and so on. Keeping the specification at a reasonable level of abstraction in this way promotes reusability. This example illustrates one possible rendering of these abstract primitives—in particular, the default rendering provided by the current Collage runtime system.

The primitives illustrated here, in the order that they appear on the screen 2202 in FIG. 22 when you run the example, are:
C:INPUT—allows the user to input a one-line string
C:OUTPUT—displays a string to the user
C:TRIGGER—triggers an action
C:TEXTAREA—allows the user to input a multi-line string
C:SECRET—allows the user to input a secret string (such as a password)
C:SELECT1—allows the user to select one item from a list
C: SELECT—allows the user to select one or more items from a list.

Specifying screen layout: The preceding example illustrated a very simple screen layout 2202 including a set of interaction units arrayed one above the other within the top-level window, represented by the c:TOP resource. Collage provides a richer layout mechanism in which the developer describes a layout tree. A layout tree includes: a set of resources connected as a tree by the Collage layout containment property c:contains; a root node, such as a c:TOP resource representing a top-level user interaction window; a set of interior nodes which are resources of a layout container class such as the built-in containers c:VBOX, c:HBOX, and c:GRID; and a set of leaf nodes which are resources of one of the abstract interaction primitives described above (c:INPUT, c:OUTPUT, etc.).

Figure 23:
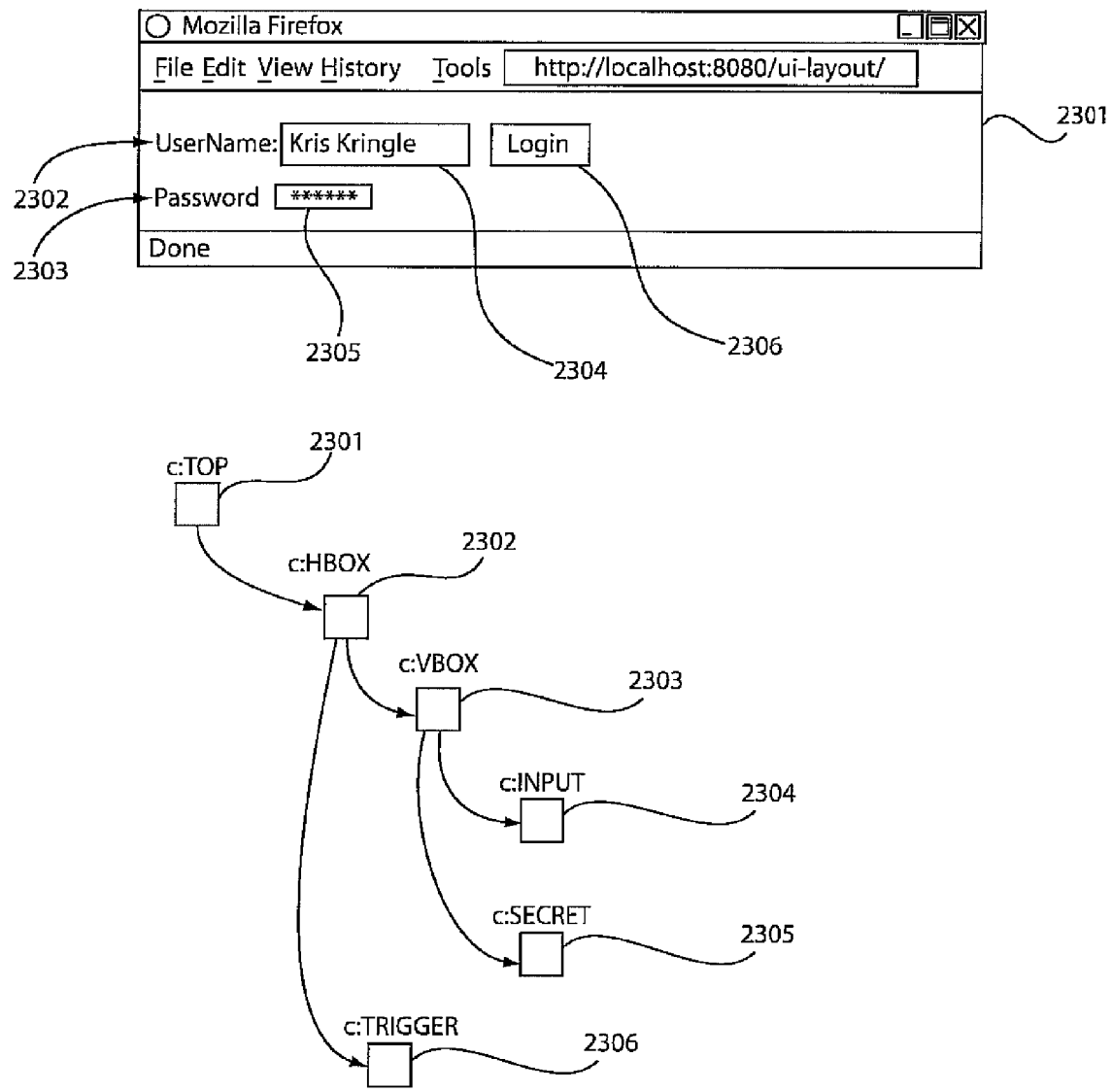
FIG. 23 is a diagram and display for demonstrating the specification of a layout in accordance with the present principles.

The example of FIG. 23 illustrates a more complicated layout, including a login form structured as follows. In this figure lines are used as an abbreviation to represent c:contains triples. A top-level user interaction window 2301 represented by a c:TOP resource, includes a horizontal flow 2302 represented by a c:HBOX resource, which includes a vertical flow 2303 represented by a c:VBOX resource, which includes a c:INPUT primitive 2304, and a c:SECRET primitive 2305, and a c:TRIGGER primitive 2306.

This structure is created by the following code:

```
<c:with anchor="c:TOP">
  <c:create property="c:contains" class="c:HBOX">
    <c:create property="c:contains" class="c:VBOX">
  <c:create property="c:contains" class="c:INPUT">
  <c:out path="c:label">Username</c:out>
  </c:create>
  <c:create property="c:contains" class="c:SECRET">
    <c:out path="c:label">Password</c:out>
  </c:create>
  </c:create>
  <c:create property="c:contains" class="c:TRIGGER">
    <c:out path="c:label">Login</c:out>
  </c:create>
    </c:create>
  </c:with>
```

This code tightly intermingles both the abstract design that there are fields for entering name and password and a trigger for submitting the information, and the concrete design which specifies how those elements are presented on a screen. The following example shows how to use Collage classification features to separate these abstract and concrete concerns.

Separating concrete from abstract user interaction: In the previous example, we defined login form with no separation of concerns between abstract and concrete design. In this example we see how to make this separation through a sequence of three refactorings.

Figure 24:
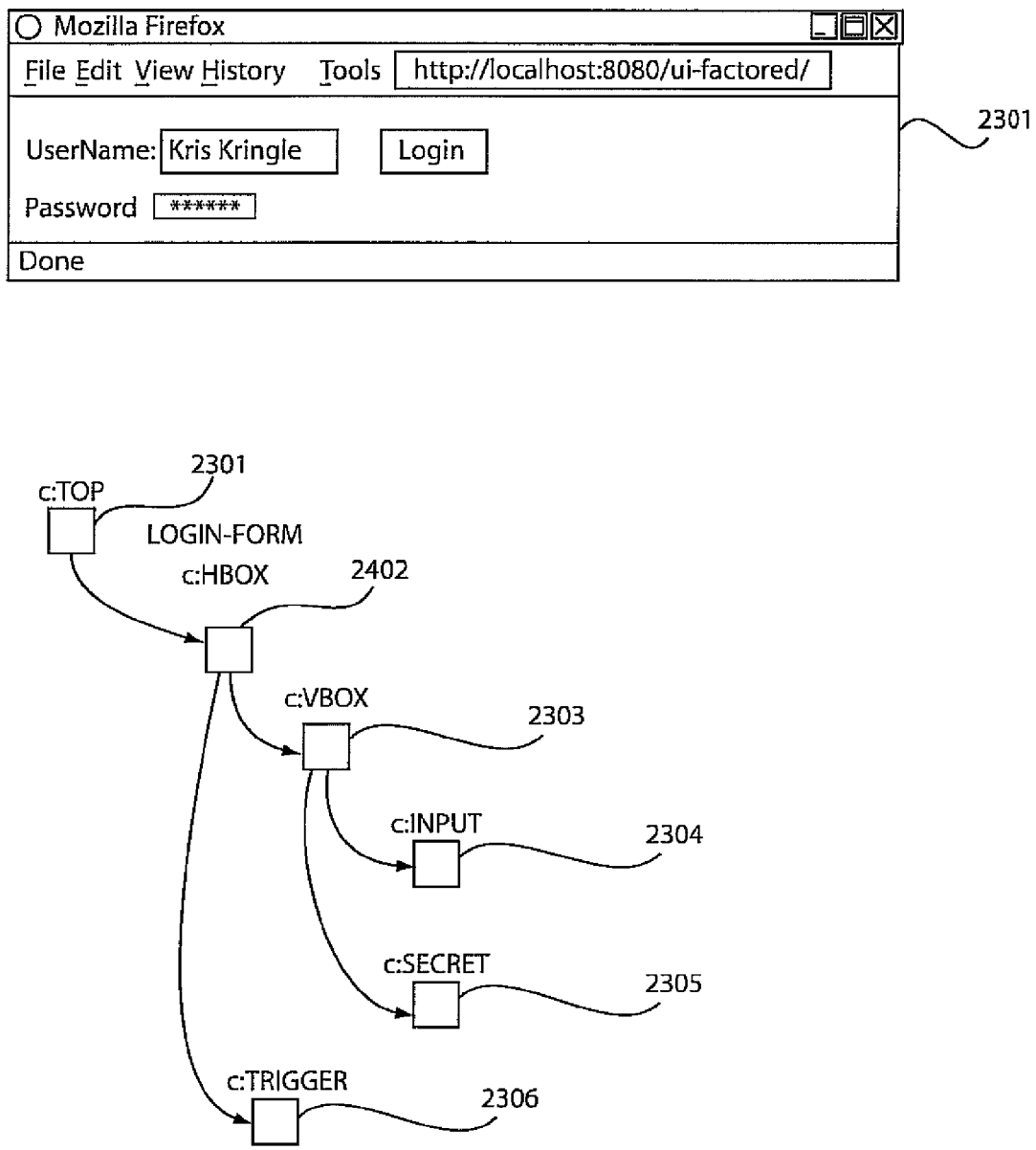
FIG. 24 is a diagram and display for demonstrating a separation between concrete and abstract user interaction in accordance with the present principles.

Referring to FIG. 24, in a first refactoring, rather than directly filling the c:TOP top-level window with the login form primitives, we introduce the abstraction of a LOGIN-FORM 2402, and fill the c:TOP top-level window 2301 with the LOGIN-FORM abstraction. The LOGIN-FORM abstraction in turn is filled with the login form primitives. As above, lines are used in FIG. 24 as an abbreviation to represent c:contains triples. The accompanying code includes:

```
<c:create anchor="c:TOP" property="c:contains"
  class="LOGIN-FORM"/>
<c:with anchor="LOGIN-FORM">
<c:let class="c:HBOX">
<c:create property="c:contains" class="c:VBOX">
<c:create property="c:contains" class="c:INPUT">
<c:out path="c:label">Username</c:out>
</c:create>
<c:create property="c:contains" class="c:SECRET">
<c:out path="c:label">Password</c:out>
</c:create>
</c:create>
<c:create property="c:contains" class="c:TRIGGER">
<c:out path="c:label">Login</c:out>
</c:create>
</c:let>
</c:with>
```

Figure 25:
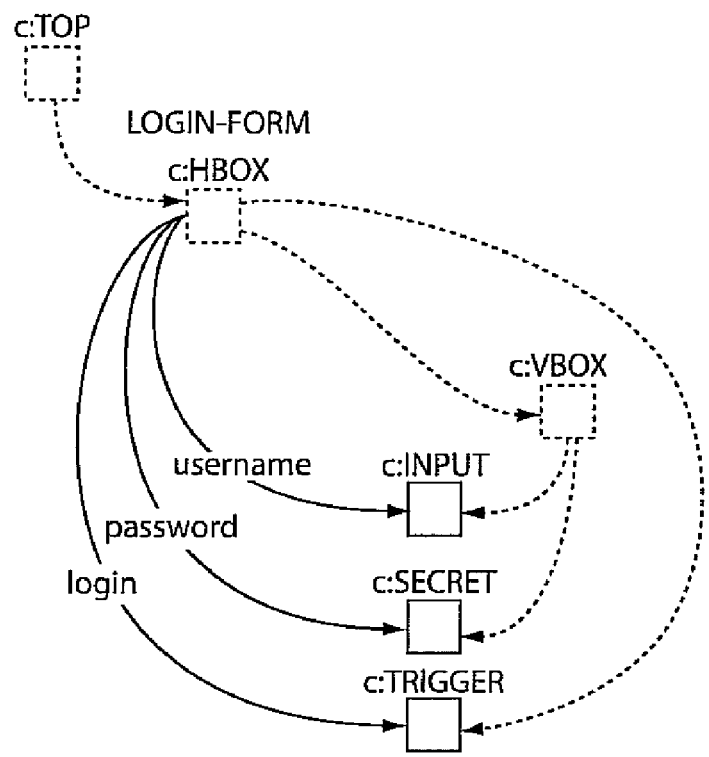
FIGS. 25 and 26 show diagrams demonstrating refactorings performed in accordance with FIG. 24.

However, in the preceding, refactoring the LOGIN-FORM abstraction is still rather concrete in that it mixes concrete layout styling information with more abstract concepts. In the next refactoring as shown in FIG. 25, we take the step of separating the form into two parts: 1) The abstract part (represented by the solid parts) which specifies that there are fields for entering name and password and a trigger for submitting the information, gives the fields names in the form of application-meaningful properties (user name, password, and login) that can be used to navigate to the fields, and gives them defined abstract behaviors by specifying their abstract user interaction classes (c:INPUT, c:SECRET, and c:TRIGGER). 2) The concrete part (represented by the dashed parts), done as an overlay on the abstract part, which specifies how the abstract elements are arranged on a screen. Note that the LOGIN-FORM resource serves a dual role through its abstract classification of LOGIN-FORM and its concrete layout classification of c:HBOX.

Figure 26:
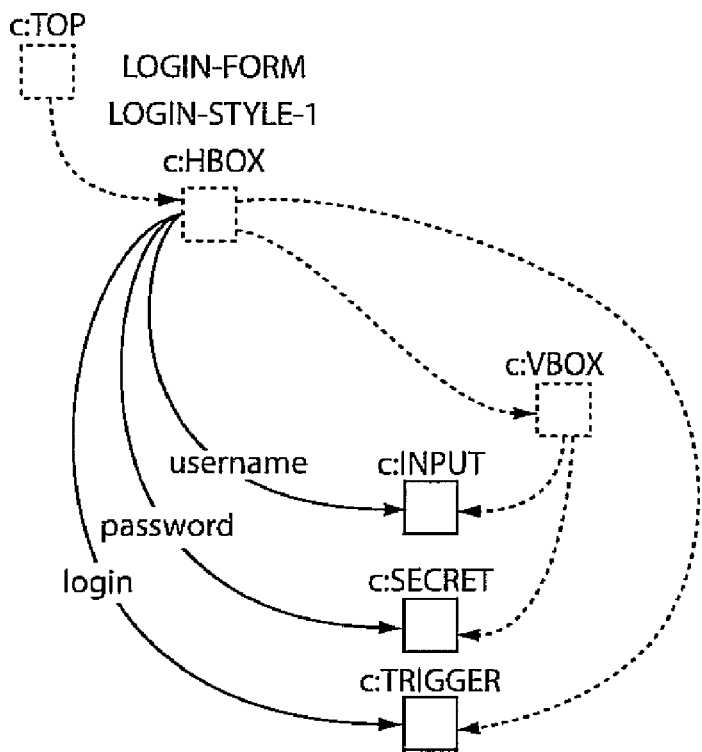

The next refactoring is depicted in FIG. 26. The accompanying code includes:

```
<c:create anchor="c:TOP" property="c:contains"
class="LOGIN-FORM"/>
<c:with anchor="LOGIN-FORM">
  <!-- abstract user interface -->
  <c:create class="c:INPUT"
  property="username"> <c:out
  path="c:label">Username</c:out>
  </c:create>
  <c:create class="c:SECRET"
  property="password"> <c:out
  path="c:label">Password</c:out>
  </c:create>
  <c:create class="c:TRIGGER"
  property="login">
    <c:out path="c:label">Login</c:out>
```

-continued

```
</c:create>
<!-- concrete layout overlay -->
<c:let class="c:HBOX">
<c:create property="c:contains" class="c:VBOX">
  <c:let property="c:contains" path="c:contains../username" />
  <c:let property="c:contains" path="c:contains../password" />
  </c:create>
<c:let property="c:contains" path="login" />
</c:let>
</c:with>
```

In the preceding refactoring, we have separated the concrete code from the abstract code, but they still remain associated with the same class, which limits flexibility. Now we take the final step of separating the concrete layout information into its own class LOGIN-STYLE-1. This allows us to separately specify the creation of the abstract LOGIN-FORM resource using <c:create class="LOGIN-FORM"/> and the styling of that resource with the LOGIN-STYLE-1 style using <c:let class="LOGIN-STYLE-1"/> The following code implements this separation.

The accompanying code includes:

```
<!-- create abstract LOGIN-FORM, give it concrete LOGIN-STYLE-1 -->
    <c:create anchor="c:TOP" property="c:contains"
    class="LOGIN-FORM">
    <c:let class="LOGIN-STYLE-1"/>
    </c:create>
    <!-- abstract user interface -->
    <c:with anchor="LOGIN-FORM">
      <c:create class="c:INPUT"
      property="username"> <c:out
      path="c:label">Username</c:out>
      </c:create>
      <c:create class="c:SECRET"
      property="password"> <c:out
      path="c:label">Password</c:out>
      </c:create>
      <c:create class="c:TRIGGER"
      property="login">
      <c:out path="c:label">Login</c:out>
      </c:create>
</c:with>
    <!-- one possible concrete styling --> <c:with anchor="LOGIN-STYLE-1">
      <c:let class="c:HBOX">
      <c:create property="c:contains" class="c:VBOX">
        <c:let property="c:contains" path="c:contains../username" />
        <c:let property="c:contains" path="c:contains../password" />
        </c:create>
      <c:let property="c:contains" path="login" />
      </c:let>
    </c:with>
```

This approach allows for the possibility of specifying different styles for the same LOGIN-FORM, and choosing from among those styles either at the point in the code where the LOGIN-FORM is created (as in this example), or elsewhere in the code. By following this approach we have achieved a separation of concerns between abstract and concrete user interaction specification.

Implementing screen flow: The preceding examples have presented static screens, in which the content of the screen—its layout, its entry fields, its buttons, and so on—do not change. Most substantial applications are implemented around a series of screens that are presented to the user one at a time, each focused on some task or subtask. The users actions determine which screens are presented and in what order. Many user interface technologies treat screen flow as a set of transitions among opaque states (where each state represents which screen is currently being viewed). The states are opaque in that they are simply names for the screens—"login screen", "order screen", "confirmation screen", and so on, with no further expression semantics. The state transitions are expressed in terms of rules such as "when the order screen is showing and the user presses the submit button, transition to the confirmation screen". This approach focuses on what transition to make, not why the transition is made.

While Collage supports this approach, it also supports and encourages an approach that is based more on why a given transition occurs. For example, in Collage the application might express rules such as "if the order is not in the submitted state show the order screen", and "if the order is in the submitted state show the confirmation screen". This approach will support more malleable applications because the rules operate independently of what path was taken to arrive at the conditions for displaying a particular screen. This means, for example, that the introduction of additional paths for arriving at a given set of conditions will automatically result in the display of the correct screen.

Figure 27:
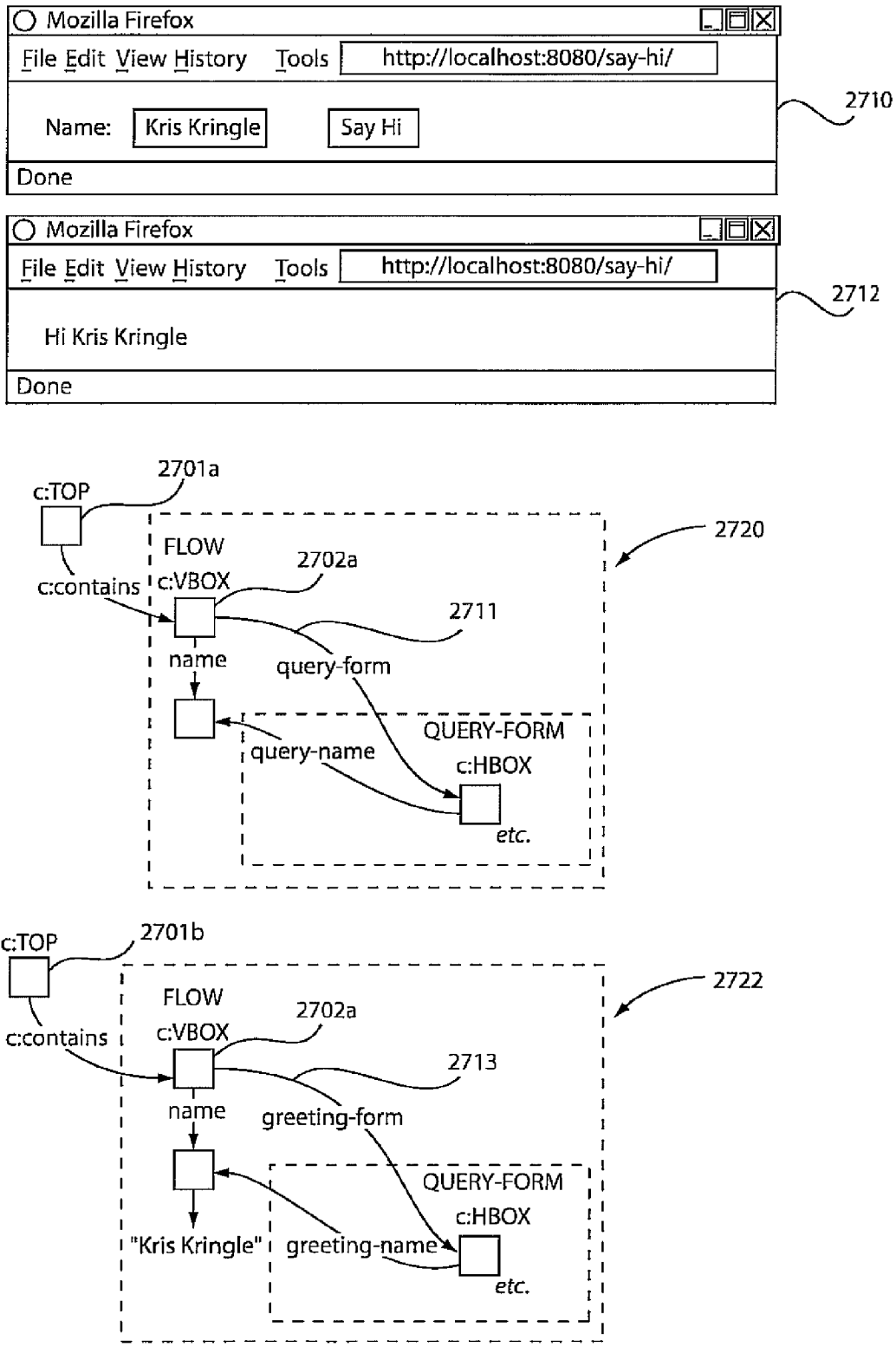
FIG. 27 shows diagrams and displays for demonstrating screen flow in accordance with the present principles.

Referring to FIG. 27, this example illustrates a very simple page transition. It in effect embodies the following two rules: 1) If the user has not entered his name, display the screen for entering a name. 2) If the user has entered his name, display a screen greeting him. By expressing the page transitions in this way, if the application is enriched by an additional path by which the users name is supplied (for example, by composition of this page flow with a larger application where the user has already entered his name), the display of the now-redundant screen requesting the user to type his name is automatically suppressed and the flow begins with the screen greeting the user.

This flow is represented by a top-level user interface container resource 2701*a* or 2701*b*, which the application has chosen to identify by a class "FLOW". A FLOW container resource 2702*a* or 2702*b* contains at any given time one of a number of child user interface resources, each representing a screen (2710 or 2712) in the flow. A <c:let> construct 2711 and 2713 for each screen (2710) and (2712) contains a conditional XPath expression that causes the corresponding screen to be created, configured, and displayed if its condition for being displayed is met. In this example, the condition is expressed by a test of whether a name has been specified. The resulting data structures for each of the two screens are shown in FIG. 27 labeled 2720 and 2722. The page flow may be conditioned on content of a top-level window, on declarative selection of top-level window content, on an RDF data model employed, an assignment of the RDF classification to the top-level window resource based on data model query. The code includes:

```
<c:with anchor="FLOW">
<!-- model -->
<c:bind init="true">
<c:out>
    <name />
</c:out>
</c:bind>
<!-- QUERY-FORM: display if name is not yet specified (2701) --> <c:let path=".[empty(name/text( ))]">
<c:create class="QUERY-FORM" property="query-form">
<c:let property="query-name" path="query-form../name"/> </c:create>
</c:let>
<!-- GREETING-FORM: display if name is already specified (2702) -->
<c:let path=".[not(empty(name/text( )))]">
<c:create class="GREETING-FORM" property="greeting-form">
```

-continued

```
<c:let property="greeting-name"
    path="greeting-form../name"/>
</c:create>
</c:let>
<!-- layout -->
<c:let class="c:VBOX">
<c:let path="query-form" property="c:contains"/>
<c:let path="greeting-form" property="c:contains"/> </c:let>
</c:with>
```

Composition: The Collage language features support modularity, reuse, customization, and composition. The examples used here relate to the user-interaction front end, but the same concepts are applicable end-to-end within an application.

Figure 28:
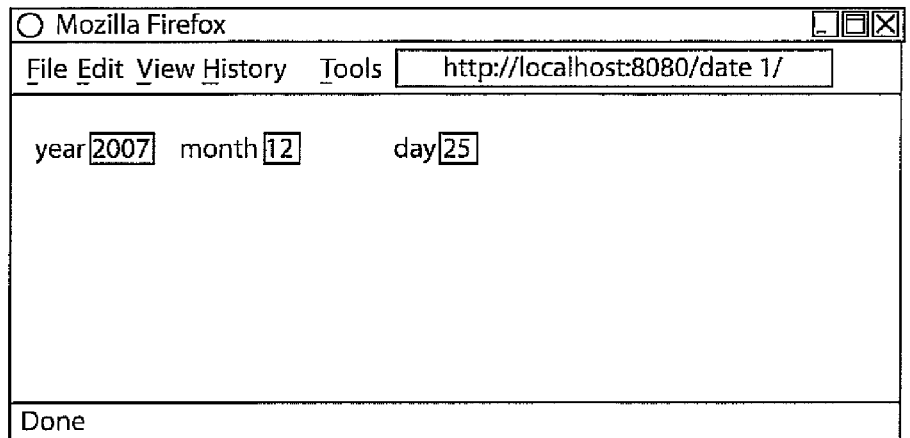
FIG. 28 is a display for demonstrating definition and use of a reusable interface component in accordance with the present principles.

Defining and using a reusable user interface component: Referring to FIG. 28, this example illustrates how to use Collage to build and use a reusable, customizable user interface component. This is illustrated by defining a reusable "date" component that allows the user to enter a date. The date component is defined as a Collage <c:unit> contained in the file ymd.xml. An instance of the date component is represented to the user of the component as a resource of class YMD. The date is stored in a model for the component that is the value of the YMD resource.

Figure 29:
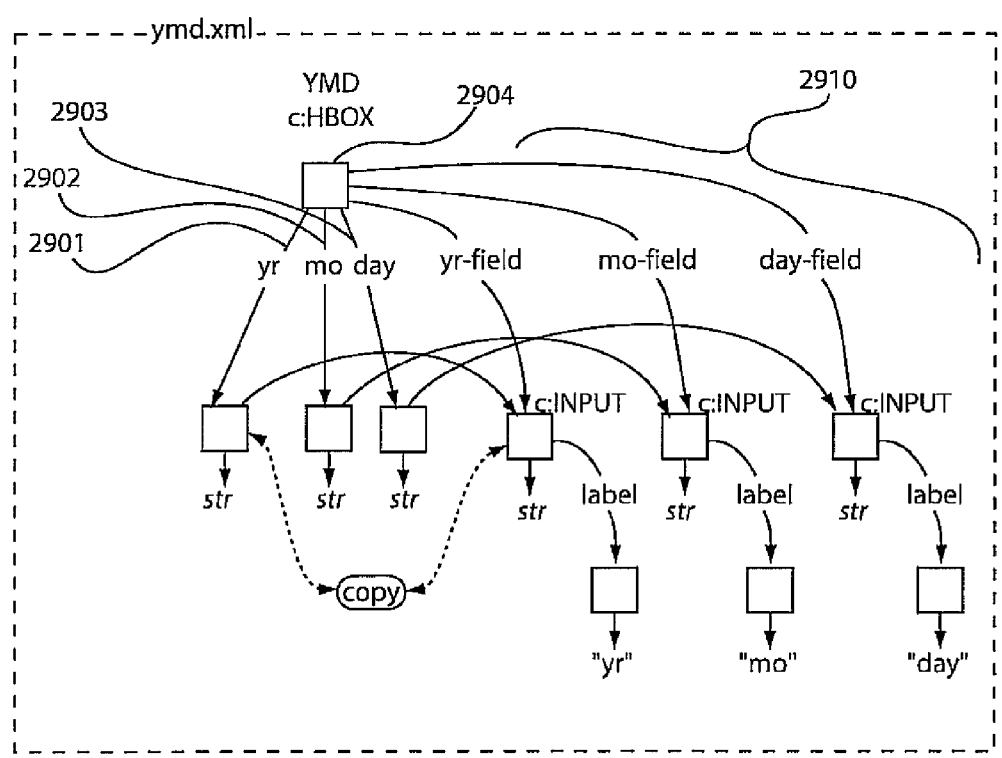
FIG. 29 is a diagram for demonstrating definition and use of a reusable interface component in accordance with the present principles.

As component authors, we have chosen to represent the date as three separate fields in a screen rendering 2801, for year, month and day. This is also illustrated in FIG. 29 by the value triples, represented by heavy lines 2901, 2902, and 2903, associated with a YMD resource 2904.

Next, the date component defines an abstract user interface 2910 for displaying and entering a date, including three labeled input fields represented by c:INPUT resources. These resources are created and associated with every resource of class YMD by the following code from ymd.xml:

```
<c:with anchor="YMD">
    <c:create class="c:INPUT" ref="yr" property="yr-
        field"> <c:out path="c:label">yr</c:out>
    </c:create>
    <c:create class="c:INPUT" ref="day" property="day-
        field"> <c:out path="c:label">day</c:out>
    </c:create>
            <c:create class="c:INPUT" ref="mo" property="mo-
                field"> <c:out path="c:label">mo</c:out>
            </c:create>
</c:with>
```

These resources define the user interaction at a relatively high level of abstraction: there will be three fields capable of displaying and entering three strings, and those strings will be bound to the yr, mo, and day fields of the component model (indicated by the ref attribute of the <c:create> construct). The date component also specifies some layout information that provides more concrete detail about the rendering of the date component. This is accomplished by the following code:

```
<c:let anchor="YMD" class="c:HBOX">
    <c:let property="ui:contains" path="yr-field"/>
    <c:let property="ui:contains" path="mo-field"/>
    <c:let property="ui:contains" path="day-field"/>
</c:let>
```

This code classifies the YMD resource with the additional class c:HBOX, which will cause the component to be displayed with a horizontal flow layout. The dual classification indicates that this resource plays two roles: the YMD classification indicates that the resource represents a particular composite interaction unit with its associated semantics, and the c:HBOX classification indicates that it has a horizontal flow layout. The code above also creates c:contains triples that indicate that the c:INPUT resources will be displayed within in the c:HBOX. Consistent with the dual role of the YMD resource, each c:INPUT resources is connected the YMD resource by two triples: 1) the yr—field, mo—field, and day—field triples are relevant to the YMD classification and indicate abstractly that the YMD resource aggregates the c:INPUT resources to form a composite interaction unit; and 2) the c:contains triples are relevant to the c:HBOX classification and indicate that the c:HBOX resource contains the c:INPUT resources in a horizontal flow.

Figure 30:
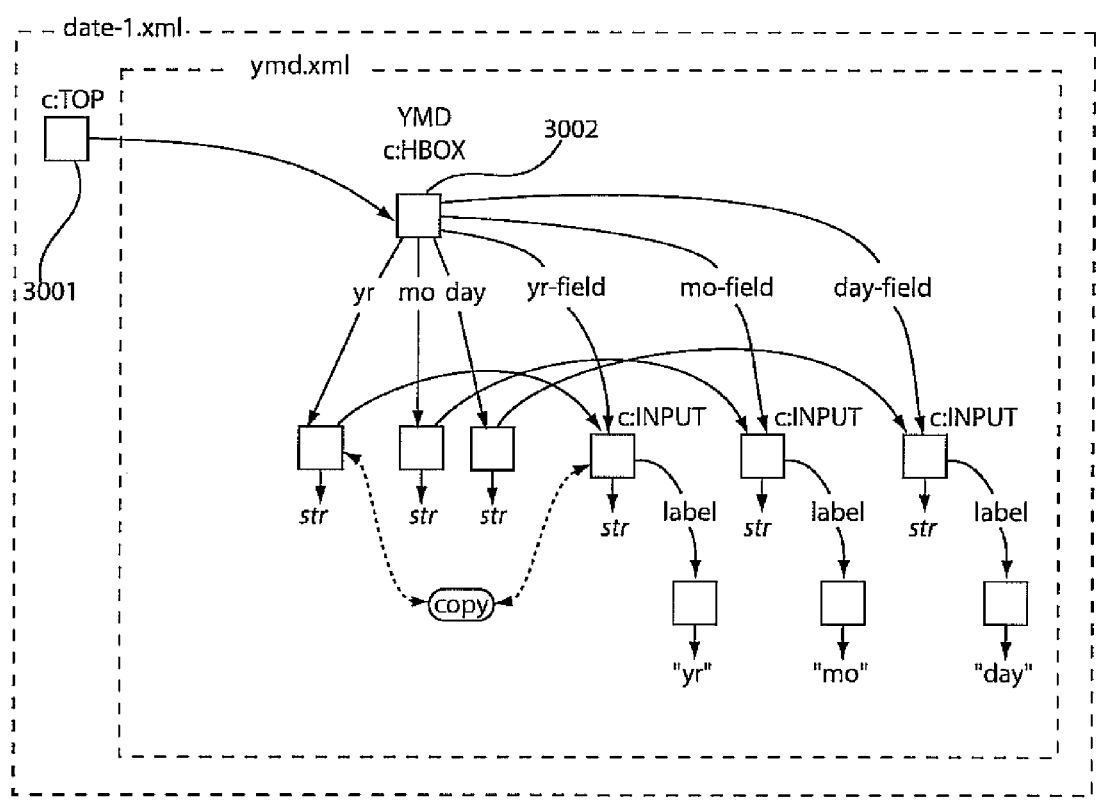
FIG. 30 is a diagram for demonstrating definition and use of the reusable compositional unit of FIG. 29 by creating a top-level resource in accordance with the present principles.

The author of the date component has chosen to include this layout and styling information in a same compositional unit (in ymd.xml) illustratively shown in FIG. 30 as the more abstract user interface elements, but as an alternative the author might have chosen to separate these two pieces of information into different compositional units. This would allow more flexibility in the layout and styling of the date component by a consumer of the component.

The compositional unit included in the file date-1.xml in FIG. 30 creates a single instance of the YMD component by instantiating a resource of class YMD 3002 and assigning it a value representing a date to be displayed initially. The YMD resource is also declared to be contained in a c:TOP resource 3001, causing it to be displayed as the top-level window content.

Adapting a reusable user interface component: Referring to FIG. 31, this example illustrates how to adapt the YMD user interface component described in the previous FIG. 30 to have a different model, including a single string that stores the date in yyyy.mm.dd format, while preserving the same user interaction model of three separate date fields defined by the Mm component. This is defined by defining a new component, represented to the consumer of the component as a resource 3102 of class DATE-STRING. A date-string.xml compositional unit 3101 defines the user interaction model for DATE-STRING resources by delegating that interaction to a YMD resource 3104. The value of the DATE-STRING resource is bound to the value of the YMD resource by a pair of c:bind constructs, one for transforming from DATE-STRING to YMD, the other for transforming from YMD to DATE-STRING. The value bindings are represented by the following Collage code:

```
<c:with anchor="DATE-STRING">
<c:bind>
    <c:in path="ymd" variable="$in"/>
<c:out path=".">{$in/yr/text( )}.{$in/mo/text( )}.{$in/day/text( )}</c:out>
</c:bind>
    <c:bind>
        <c:in path="." variable="$in"/>
        <c:out path="ymd">
            <yr>{tokenize($in, '\.')[1]}</yr> <mo>{tokenize($in, '\.')[2]}
                </mo> <day>{tokenize($in, '\.') [3]}</day>
        </c:out>
    </c:bind>
</c:with>
```

The first <c:bind> construct is triggered by any change to the value of the YMD resource; it concatenates 3112 the three fields representing year, month, day and updates the DATE-STRING resource value with the concatenated values. This will happen for example on any user input to any of the three fields, meaning that the DATE-STRING resource is kept continuously consistent with what the user has typed so far.

The second <c:bind> construct is triggered by any change to the value of the DATE-STRING resource; it splits 3114 the DATE-STRING into three values representing year, month, day, and constructs a composite value representing the same information that becomes the value of the YMD resource. The composite value is constructed in XQuery as an XML document 3106. This XML document is then interpreted as a set of triples with predicates yr, mo, and day that constitute the new value of the YMD resource. This bind will be triggered by any external programmatic change to DATE-STRING, for example in response to some form of user input in some other portion of the program as indicated in screen 3110.

Customizing a reusable user interface component: Referring to FIG. 32, this example illustrates how to customize the DATE-STRING component described in the previous section to include an additional field that displays the date as a single date string, in addition to the three fields individually displaying the year, month, and day. This is accomplished simply by declaring an additional c:INPUT 3202 anchored to the DATE-STRING resource 3204, and binding its value to the value of the DATE-STRING resource 3204. The ref attribute specifies that the value of the c:INPUT re-source 3202 is bound to the value of the DATE-STRING resource 3204. As a result, any update to this new c:INPUT 3202 triggers the execution of a bind 3206 marked "split" in FIG. 32, which updates the value of the YMD resource correspondingly; and any input that updates one of the three fields of the YMD resource triggers the execution of the bind marked "cone" and therefore of the bind marked "copy", which brings the value of the new c:INPUT resource into agreement with the new value of the YMD resource. This is accomplished by the following code:

```
<c:with anchor="DATE-STRING">
    <c:create class="c:INPUT" ref="." property="date-field">
    <c:out path="c:label">date</c:out>
    </c:create>
</c:with>
```

Note that while this code in effect modifies the definition of the DATE-STRING class by associating additional dependent structure (the new c:INPUT resource) and new behavior (the binding of the values of the DATE-STRING resource and the new c:INPUT resource) with every resource of class DATE-STRING, this is accomplished without modification to the date-string.xml unit. This illustrates that class definitions—definition of dependent structure and definition of behavior associated with updates to resources of a given class—are orthogonal to compositional units. In this case the complete definition of DATE-STRING is split between the original date-string.xml unit and the new date-3.xml unit.

More language features: This section shows how to use Collage beyond the basics for operating on collections, and to select data based on content.

Using "let" to work with collections: Referring to FIGS. 33 and 34, this example shows how to use <c:let> to work with elements of a collection. The example begins, as with previous examples, by initializing the value of the model using a <c:bind> construct Unlike previous examples, in this example a collection including a set of repeated XML bob elements 3401 is created. Then, a <c:let> construct 3400 is used to iterate over the collection of foo/bob resources, creating a c:OUTPUT 3402, a c:TRIGGER 3403 and a <c:bind> for each foo/bob of the model. Pushing one of the created c:TRIGGERs 3302 writes the data content of the corresponding foo/bob to a single c:OUTPUT 3404 defined outside of the <c:let> construct. The accompanying code may include:

```
<c:let anchor="c:TOP" path="foo/bob" property="items" class="BOB">
   <!-- trigger (to select this 'bob') -->
   <c:create class="c:TRIGGER" property="bob-trigger">
   <c:out path="c:label">Select</c:out>
   </c:create>
   <!-- output field (for the data content of 'bob') -->
   <c:create class="c:OUTPUT" property="bob-output"
ref="."/>
   <!-- bind (executed by pressing trigger) -->
   <c: bind>
      <c:in path="bob-trigger"/>
      <c:in path="." variable="$input"
passive="true"/>
      <c:out path="items../selected-
bob">{$input}</c:out> </c:bind>
</c:let>
```

The <c:let> construct in this example performs the following functions. Each foo/bob resource is classified as a BOB 3401. This identifies the resources being iterated over. Each foo/bob resource is connected to the resource that identifies the containing component with an items property 3408. This makes it possible to navigate from each BOB resource to the containing component, and from the containing component to each BOB. Note particularly that the <c:bind> construct uses the path items . . . /selected-bob to navigate from its BOB anchor to the single c:OUTPUT that displays the value of the BOB resource corresponding to that trigger. A set of resources 3402, 3403 and binds (not shown) is created for each BOB resource by syntactically enclosing <c:output> and <c:trigger> constructs (respectively) in the <c:let> construct 3400. This makes the BOB class the anchor class for the constructs, meaning that each such enclosed construct will generate one resource or bind (respectively) for each BOB resource.

Using XPath to selectively query data: Referring to FIG. 35, this example shows how to use XPath with a query to access a particular element from a collection. The collection in this example includes a set of resources each having a unique identifier id and some information data that is associated with the identifier. The accompanying code may include:

```
<c:bind anchor="c:TOP" init="true">
   <c:out>
      <foo>
         <bob>
            <id>1</id>
            <data>the first</data> </bob>
         <bob>
            <id>2</id>
            <data>the second</data> </bob>
         <bob>
            <id>3</id>
            <data>the third</data> </bob>
      </foo>
   </c:out>
</c:bind>
```

The above program also provides a c:INPUT field into which the user may type one of the identifiers. If the id of a foo/bob from the model data structure is entered into the c:INPUT the selected property is updated to point to the foo/bob whose id has been entered. Then, when a c:TRIGGER (not shown) is pressed, the corresponding data of that bob is displayed in a c:OUTPUT (not shown).

Figure 36:
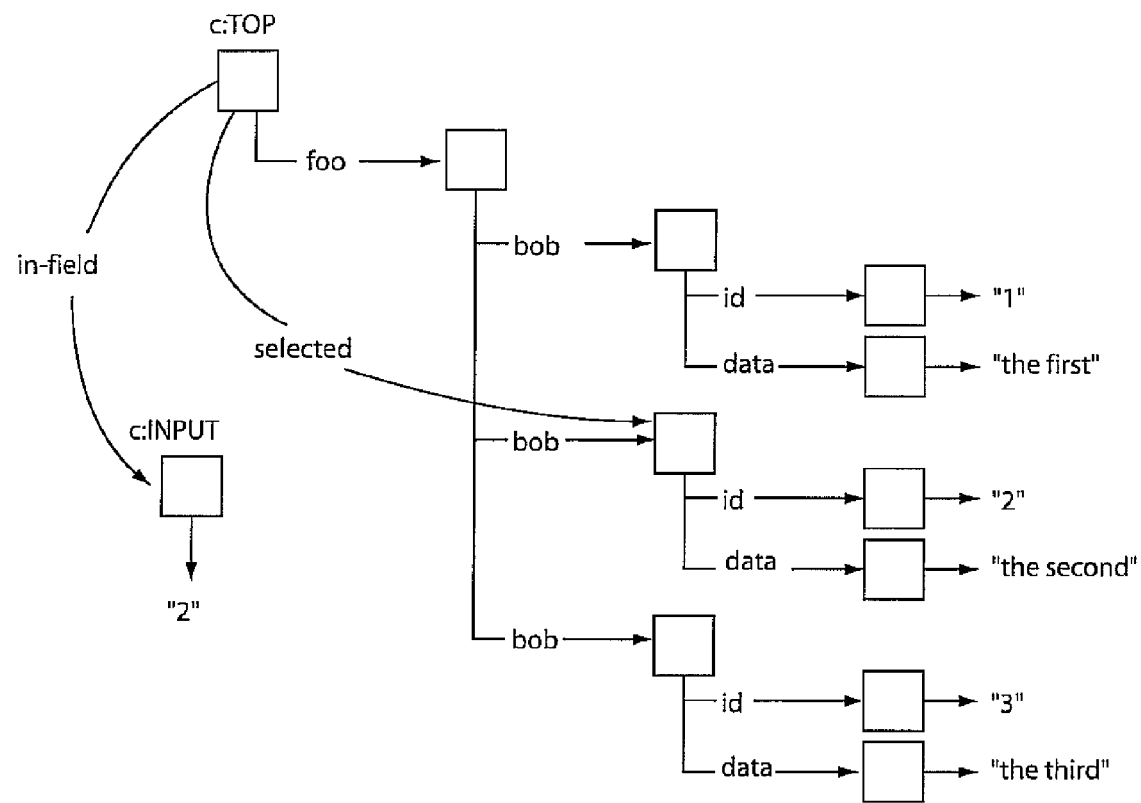
FIG. 36 is another diagram for demonstrating the use of XPATH for querying data in accordance with the present principles.

As mentioned above, the selected property is updated to reflect the resource selected by the current field. This is accomplished by the following <c:let> construct. The <c:let> construct specifies that for every resource R of class c:TOP, and for every resource S reachable by the specified path expression from R, a triple of the form [R selected S] is created. When the program state changes such that S is no longer reachable via the path from R, the corresponding triple is removed by the system. This is shown in the following code and in FIG. 36.

```
<c:let anchor="c:TOP"
         path="foo/bob[id/text( )=$anchor/in-field/text( ) ]"
         property="selected">
         <c:in variable="$anchor" path="."/>
   </c:let>
```

Using the Collage functionality and features, many new applications can be supported. In one example, MVC units from one application may be employed in other applications. This is explained in greater detail below. The following examples of MVC designs may be implemented using RDF for a data model. The data structures in the FIGS. are preferably RDF. For example, square boxes are resources and lines are triples. This conventional has been employed throughout for consistency. The application of RDF is preferably employed for writing user interface programs.

Figure 37:
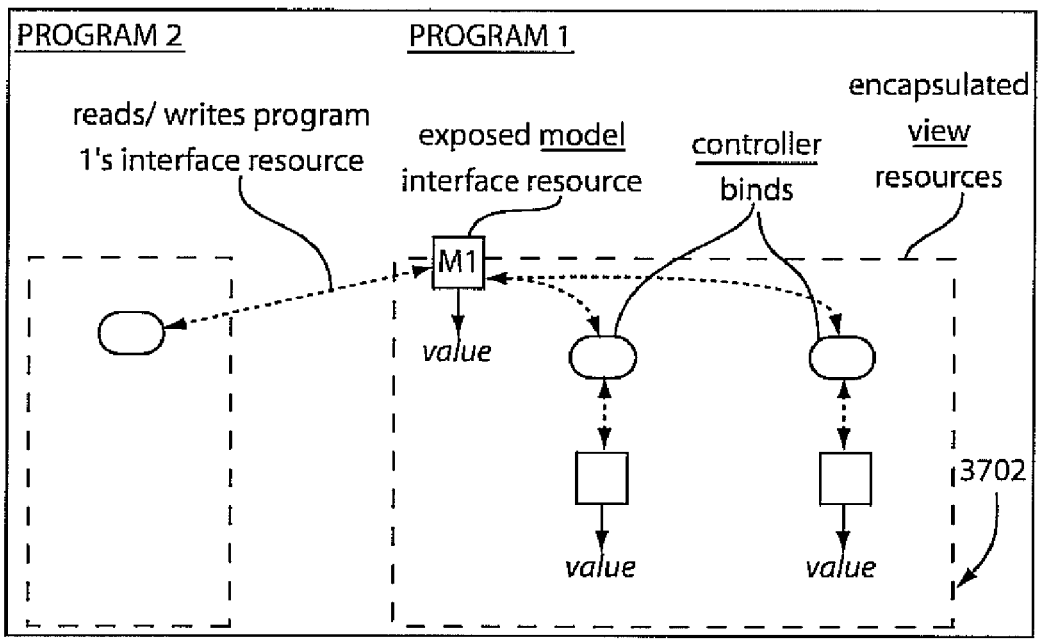
FIG. 37 is a diagram showing a model view controller (MVC) with an exposed model accessed by another program in accordance with one embodiment.

Referring to FIG. 37, an MVC unit 3702 may be employed as a programming model abstraction. In one embodiment, a first user can employ MVC 3702 or portions thereof from another program as indicated in the following example. From a developer point of view, a first programmer writes program 1 defining MVC data structures therein (see e.g., the structure described in FIG. 1). A second programmer writes program 2 that employs an exposed model M1 defined in program 1. During operation, M1 functions as an abstraction interface. Program 1 constructs the MVC data structure (MVC 3702). Program 1 permits access to M1, and program 2 communicates with program 1 reading and writing M1. Program 1 responds to reads/writes of M1 by taking further action, e.g., since M1 is an interface resource information may be exchanged between program 1 and program 2. The exposed model M1 may be employed in developing a program or as a user interface.

It should be understood that in the examples program 1 and program 2 may be programs on a same machine at a same location, on different machines at different locations, or may be different parts of the same program.

MVC units 3702 may be employed as an encapsulation mechanism ("exposed model") where program 1 permits access only to M1 which is exposed. Other portion of the MVC 3702 may be restricted from access by other programs.

Figure 38:
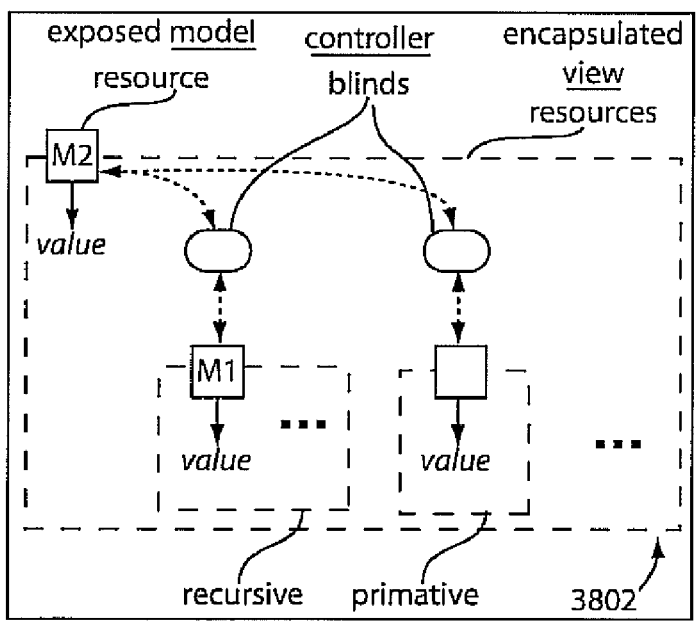
FIG. 38 is a diagram showing an exposed model with recursive changes which affect other components in the MVC in accordance with another embodiment.

MVC units 3702 support recursive specialization. For example, referring to FIG. 38, an MVC 3802 may be created by program 2. Program 2 may in turn define an M2 abstraction interface using M1 from program 1. MVC units supporting recursive specialization may be used to implement a renderkit.

Referring again to FIGS. 11 and 37, a separate specification of a layout tree as an overlay on an abstract presentation description can be provided as indicated in FIG. 11. From a developer's perspective, programmer 1 writes program 1 defining an abstract user interface (FIG. 11), and programmer 2 writes program 2 defining a layout operational view. In FIG. 11, c:INPUT, c:SECRET and c:TRIGGER comprise the abstract user interface (UI) specified by program 1, and c:TOP, c:HBOX, and c:VBOX are layout specified by program 2. In operation, program 1 constructs the data structure representing abstract user interface (UI), and program 2 constructs overly (additional) data structures specifying layout. RDF classes may be employed for classification as a separate specification mechanism (see e.g., notations next to square boxes (e.g., c:TOP, LOGIN-FORM, etc., which represent RDF classes) in FIG. 11.

The RDF may also be employed as a choice of presentation style. In a classification embodiment, from the developer point of view, programmer 1 writes program 1 defining an abstract user interface (in FIG. 11). Programmer 2 writes program 2 defining a concrete appearance. In the operational view, program 1 constructs a data structure representing abstract user interface, and program 2 constructs overly (additional) classifications using RDF classes. For example, program 1 specifies resource R1 (M1 in FIG. 37) has RDF class c:DATE (meaning, abstractly, a user interface affordance for collecting a date). Program 2 specifies resource R1 has RDF class c:CALENDAR (meaning the date selector is presented to the user as a calendar widget). In another embodiment, program 2 specifies resource R1 has RDF class c:DATE-STRING (meaning the date selector is presented to the user as a simple text input field).

A deployment and distribution model will now be described. The unit of deployment in Collage is called a service. A service is a logical computing node, comprising 1) a root URL (Uniform Resource Locator) that identifies and locates the service, and is the base URL for all resources managed by the service; 2) a triple store that represents the runtime state of the system as a set of RDF triples; 3) a set of composition units, each defined by a <c:unit> construct. A service deployment description specifies a root unit, and the set of units loaded by the service includes the root unit together with all units recursively imported using the <c:import> construct; 4) a set of resources that are managed by the service. Each resource is identified by a URL that begins with the service's URL. A resource per se is just a point in a namespace, and therefore requires no intrinsic storage. All storage associated with a resource takes the form of triples whose subject or object is that resource. Storage allocation and deallocation happens at the triple level; therefore there is no need in Collage for a mechanism to destroy resources.

A service is described by a <c:service> construct included in a deployment descriptor. A deployment descriptor may include multiple <c:service> constructs, supporting the case of multiple logical computing nodes managed by a single physical computing node. For example, the following deployment descriptor specifies a single service with a root URL of http://example.com:8080/weather/ and a root unit consisting of the <c:unit> construct found in the file weather.xml. The codes includes:

```
<c:deployment>
    <c:service location="http: //example.com:8080/weather/"
    unit="weather.xml"/>
</c:deployment>
```

Figure 39:
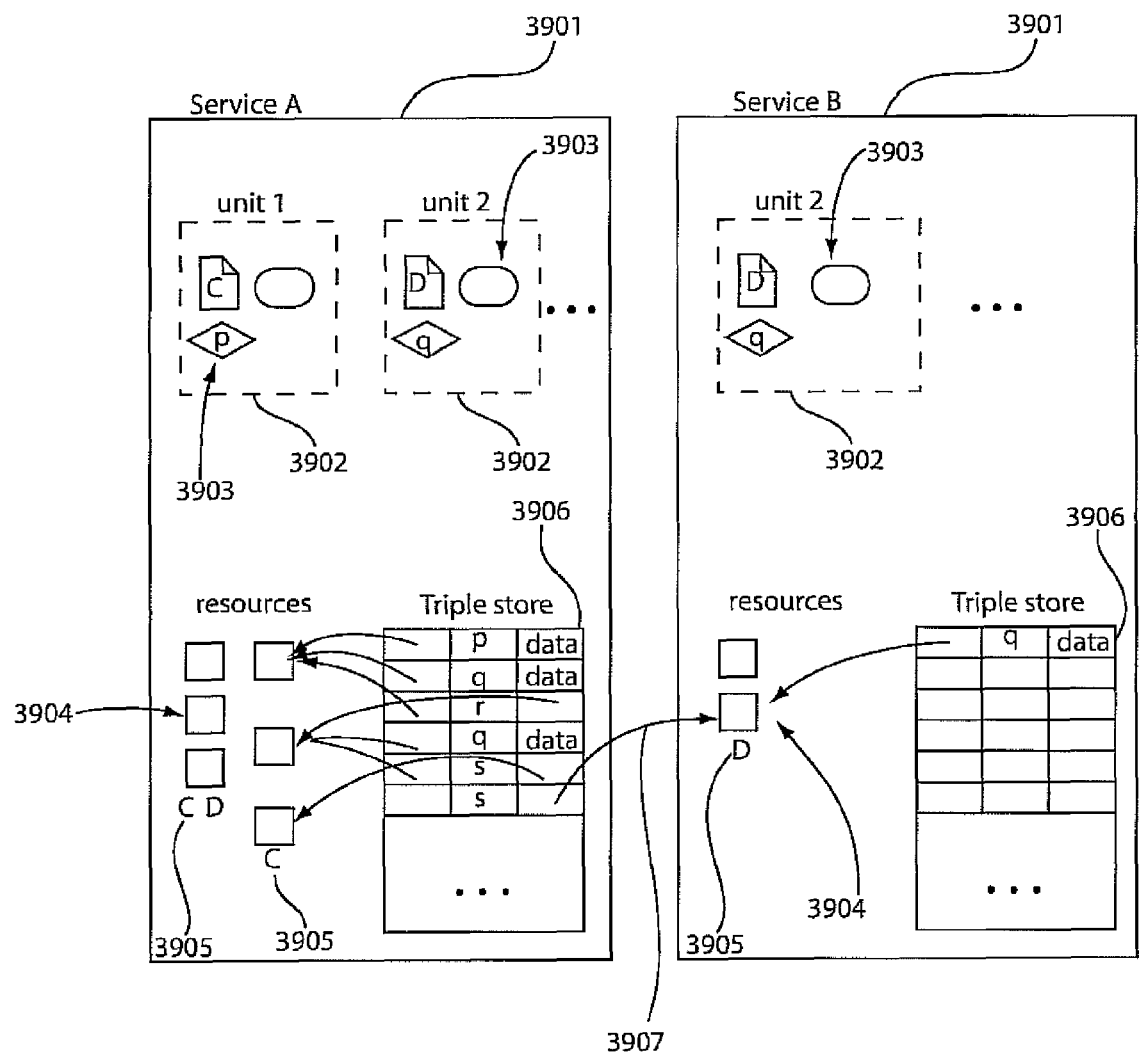
FIG. 39 is a diagram showing communication between services in accordance with an illustrative embodiment.

Referring to FIG. 39, a diagram illustrates the Collage approach to application deployment and distribution. Distributed computation is achieved by the use of URLs that cross service boundaries. That is, a service with prefix URL prefix A may include triples whose resources are identified by URLs beginning with the prefix B of another service. If for example a <c:bind> construct has a path expression that uses such a triple, it may refer to input and output resources that are managed by different services. In this case a change to the value of a resource managed by one service might cause a change to the value of a resource managed by a second service, resulting in distributed program execution.

Distributed computation is achieved by the use of URLs that cross service boundaries. That is, a service with prefix URL prefix A may contain triples whose resources are identified by URLs beginning with the prefix B of another service. Employing this approach to distributed applications requires a strategy for associating triples with services, including replication of shared state across services, based on the URLs of the subject and object resources. In addition, efficient implementation protocols are needed. The Collage protocol that supports distributed Collage program execution is preferably defined as a set of XML message elements. The message elements are batched in a message envelope to allow more efficient communication. The message envelopes are transmitted as the request and response payloads of HTTP post requests directed at the service URLs. Specific messages and their contents may be defined in the Collage protocol.

Collage treats a browser as a Collage computing node, that is a service, with possibly limited capability. The browser is capable of initiating updates for resources related to user inputs, of receiving notification of updates to resources related to user outputs, and of receiving and displaying Collage value trees, represented as XML documents, that represent screen layouts. It is envisioned that portions of a Collage program may be compiled to Javascript and loaded into the browser for execution to create a more responsive user experience.

Each service is employed on a logical computing node (e.g., a browser) 3901. Each service has a URL that is the root of the URLs for all resources managed by that service. In the program code, a service runs one or more compositional units 3902, which includes a root unit and all recursively imported units. Each compositional unit 3902 defines at least partially a set 3903 of classes, properties and binds.

Runtime data includes a set of resources 3904. Each resource (box) is a point in a namespace (e.g., a namespace of URLs prefixed by the service URL). Resources 3904 are programmatically created, and are dynamically and multiply classified (3905). A triple store 3906 includes RDF triples that associate data with resources and resources with each other to form data graphs and trees. Triples are programmatically created. Resources references 3907 may cross service boundaries, and therefore may cross computational node boundaries.

Distributed computation is achieved by the use of URLs that cross service boundaries. That is, a service with prefix URL prefix A may include triples whose resources are identified by URLs beginning with the prefix B of another service. If for example a <c:bind> construct has a path expression that uses such a triple, it may refer to input and output resources that are managed by different services. In these cases, a change to the value of a resource managed by one service may cause a change to the value of a resource managed by a second service, resulting in distributed program execution.

Employing this approach to distributed applications needs a strategy for associating triples with services, including replication of shared state across services, based on the URLs of the subject and object resources. In addition, efficient implementation protocols are needed. In one instance, for example, the execution of a bind can be accomplished, at a protocol level, by an appropriate HTTP POST.

Protocol: The Collage protocol that supports distributed Collage program execution may be defined as a set of XML message elements. The message elements are batched in a message envelope to allow more efficient communication. The message envelopes are transmitted as the request and response payloads of HTTP post requests directed at the service URLs. For example: <envelope cascade="cascade-id" state="cascade-state"> message elements </envelope>.

A message envelope includes a set of message elements relating to a particular cascade, identified by a globally unique cascade identifier that is allocated at the point of origin of a cascade. Each cascade is in one of a set of states defined by the execution model. The state attribute identifies the state of the current cascade, allowing distributed services to remain in sync with regard to the processing of a cascade. Permissible states include PROC_LET, PLAN_BIND, EXEC_BIND, and FINISH.

<listen url="resource-url"/>.

A <listen> message is in effect a request to subscribe to the value of a given resource. It instructs the receiving service to inform the sending service of updates to the value of the specified resource by sending <update> messages. For example, <update init="init-flag" url="resource-url"> new resource value </update>.

An <update> message informs the receiving service of a new value for a given resource. The value is transmitted as a list of XL child elements, representing the new value tree for the specified resource. The init flag, if set to true, specifies that the given resource is a new resource and may be initialized by a bind that targets the resource and has an init flag set to true. For example, <added s="subject-url" p="predicate-url/" o="object-url"/><removed s="subject-url" p="predicate-url" o="object-url"/>.

An <added> or <removed> message specifies that a triple that is of interest to the receiving service has been added to or removed from the triple store 3906 of the sending service.

A <status> message is sent in response to one or more of the messages described above to inform the receiving service of whether the sending service has further binds or lets to process. The receiving service uses this information to determine when the outer iteration loop of the execution cycle may terminate. For example, <status binds="binds-flag" lets="lets-flag"/>

Browser model: Collage treats a browser as a Collage computing node, that is, a service, with possibly limited capability. In the current implementation, upon first contacting a service with an HTTP GET request, a browser is sent a bootstrap Javascript program whose execution makes the browser a limited Collage node, capable of managing resources related to the presentation of the user interface. After this initial bootstrap exchange further communication between the browser and the server is via HTTP POSTs using the Collage protocol outlined above. This is accomplished with an AJAX-style JavaScript Collage Engine 4018 (FIG. 40) running in the browser.

The browser is capable of initiating updates for resources related to user inputs, of receiving notification of updates to resources related to user outputs, and of receiving and displaying Collage value trees, represented as XML documents, that represent screen layouts. It is envisioned that portions of a Collage program may be compiled to Javascript and loaded into the browser for execution to create a more responsive user experience.

Figure 40:
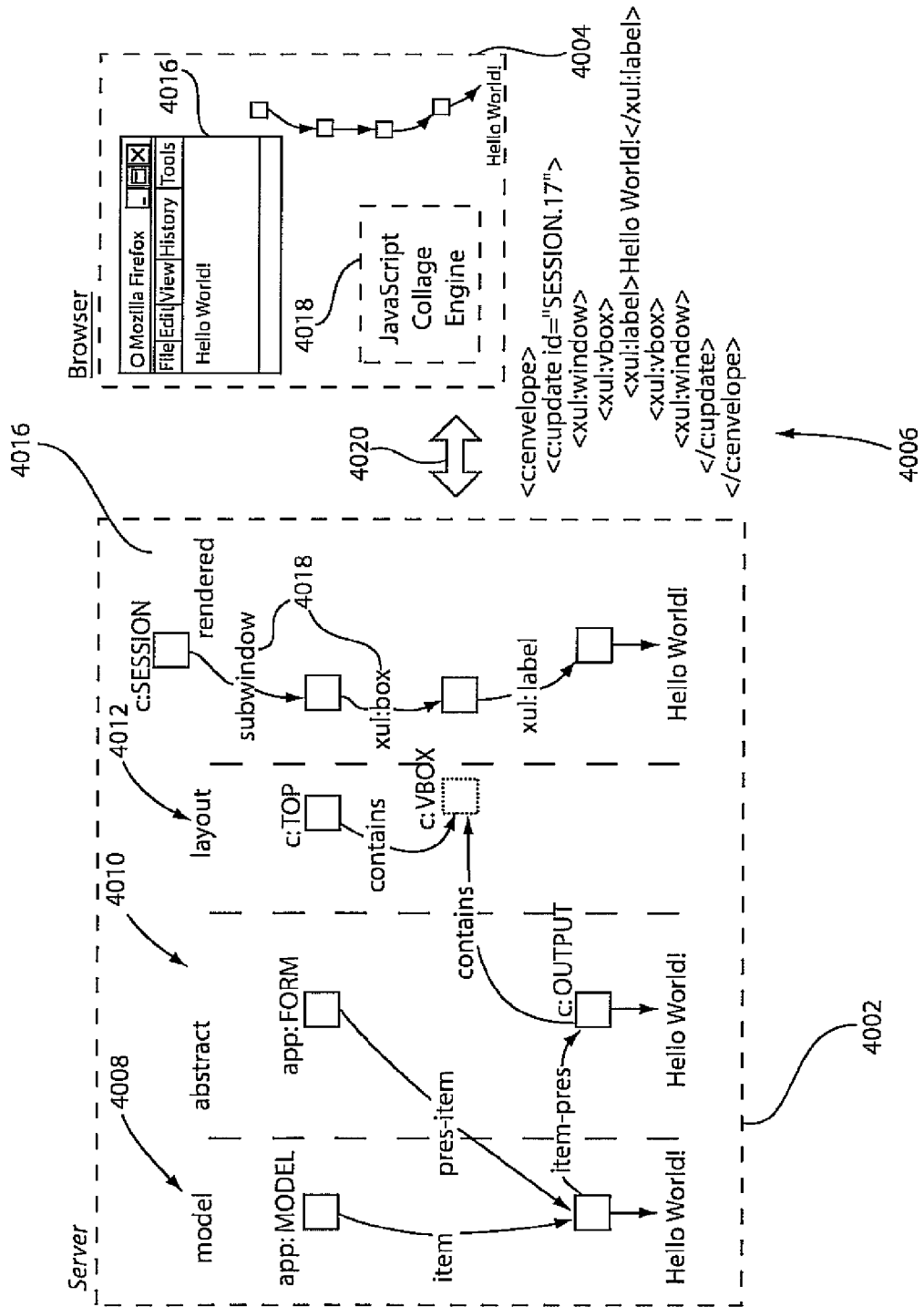
FIG. 40 is a diagram showing communication between a server and a browser (two nodes) in accordance with an illustrative embodiment.

Referring to FIG. 40, a server 4002 has a Collage service running on it, while a browser 4004 is connected to the server 4002. The browser 4004 itself is a limited-function Collage node. Upon connecting to the server 4002, a c:SESSION resource is allocated representing that browser session. Application code 4006 specifies semantics for a model 4008, abstract user interface 4010, and abstract layout 4012. System code renders this user interface 4016 in a browser-specific technology (in this example, XUL).

The Collage protocol infrastructure then maintains equality between the server and browser copies of the rendered user interface representation by sending Collage update messages 4020, in both directions. Update messages 4020 are sent from the browser 4004 to the server 4002 representing user actions, such as input values and trigger presses, which initiate an execution cycle that is distributed between the server 4002 and the browser 4004. This is facilitated by a Collage engine 4018, which employs, e.g., Javascript. Update messages 4020 are sent from the server 4002 to the browser 4004 to inform of updates to the information to be displayed to the user, either as part of an execution cycle initiated by the browser in response to a user action in the browser, or as part of an execution cycle initiated elsewhere. The latter case is seen by the user at the browser as an asynchronous (relative to the user's actions) push of information to the browser.

This provides a programming model that supports bi-directional transformations, e.g., date concatenate/date split type interactions. In this case, the browser 4004 is a collage listener (i.e. speaks protocol) and an initial download of a listening engine to browser may be provided. A user interface (UI) and updates may be transmitted to the browser as the browser listens for changes to rendered RDF data structures, e.g., the communication between computing nodes is based on messages communicating changes in resource values, or based on the addition and deletion of triples to a triple store. The resources may include RDF resources, and values may be c:values.

The programming model supports sub-page updates without explicit programmer coding of messages between browser and server, and the communication protocol between the browser and server is preferably the same as the communication protocol between server nodes.

The goal of the Collage project is to design a radically simplified declarative programming model and runtime expressly targeted at building and deploying cross-organizational software as compositions of web components. An additional goal is to support an evolutionary style of software development that allows rapid application prototyping, but also enables progressive refinement of the initial prototype into a hardened asset.

The declarative data and execution models of Collage support a flexible approach to application development and composition. Composition in Collage centers on resource classes. Every Collage executable construct (<c:bind>, <c:let>, and <c:create>) has an anchor class that identifies a class of resources that control the execution of that construct. A resource of an anchor class for a particular construct is called an anchor resource for that construct. In addition, Collage executable constructs use path expressions to declare navigation paths relative to anchor resources that identify the resources that serve as the operands for the executable construct. The semantics of the executable constructs are then described declaratively, relative to the operands identified by anchor classes and path expressions. This approach results in executable constructs that are highly composable—that is, the semantics of a set of such constructs taken together is largely the conjunction of the semantics of each individual construct, subject to consistency limitations. In the current language definition, it is a program error if the constraints implied by a composition of language constructs are inconsistent.

A <c:bind> construct with anchor class A generates a set of bind instances, one for each anchor resource of class A. Each bind instance expresses a declarative functional relationship between the new value of its output resource, and the old and/or new values of its input resources. This functional relationship is in effect a rule or constraint concerning the values of the input and output resources. These rules or constraints are readily composable provided that they are consistent.

A <c:let> construct with anchor class A controls a set of triples whose subjects are the anchor resources of class A. Thus c:let> functions as a composable rule that governs the existence of a well-defined set of triples. A <c:create> construct with anchor class A controls a set of triples whose subjects are the anchor resources of class A. Thus, <c:create> functions as a composable rule that governs the existence of a well-defined set of triples and resources.

Collage shares its dependence on classification of resources with many languages, including for example familiar object-oriented languages. However, it differs from those languages in a key respect: in Collage, the definition of a class—that is, the total set of program artifacts that specify the behavior associated with resources of the class—are not limited to a single syntactic unit, nor a single program artifact. In Collage, the definition of a class A is in effect the complete set of program constructs with anchor class A. Furthermore, the anchor class for an executable construct may be specified by the construct itself using the anchor attribute for example:

```
<c:bind anchor="A">...</c:bind> <c:let anchor="A" .../>
<c:create anchor="A" .../>
```

Program constructs in Collage are contained in a top-level XML element, <c:unit>, that defines a composition unit. Composition units are composed by use of the <c:import> construct. A deployed Collage program consists of a composition unit composed with the set of composition units that it recursively imports. The collection of constructs wig anchor class A that in effect functions as the definition of class A may be contained in multiple composition units, for example:

```
<c:unit>
<c:import unit="unit1.xml"/><!-- compose unit1.xml -->
<c:import unit="unit2.xml"/><!-- compose unit2.xml -->
<c:bind anchor="A" init="true"> <111 !-- assign resources>
<c :out>10</c:out>
</c:bind>
</c:unit>
unit1.xml
<c:unit>
<c:create anchor="A" class="B" property="the-B"/> <!-create dependent resource>
<c:bind anchor="A"> <!-- bind its value to the anchor>
<c: in variable="$a"/>
<c:out path="the-B">{$a+1 }</c:out>
</c:bind>
</c:unit>
unit2.xml
<c:unit>
<c:create anchor="A" class="C" property="the-C"/><!-- create dependent
```

```
resource>
<c:bind anchor="A"> <!-- bind its value to the anchor>
<c:in variable="$a"/>
<c:out path="the-C">{2*$a}<c:out>
</c:bind>
</c:unit>
```

Figure 41:
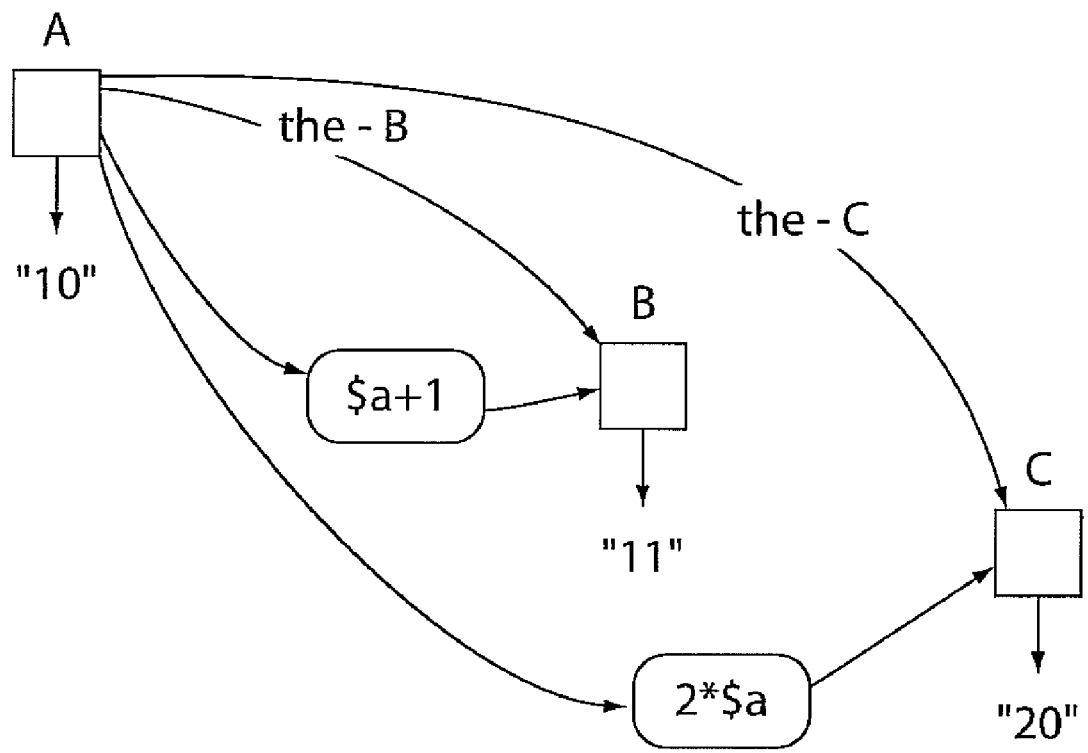
FIG. 41 is a diagram showing anchoring of constructs in accordance with one illustrative example.

The above code is illustratively depicted in FIG. 41. The net effect of this composition is that for every resource of class A, dependent resources of class B and class C are created, and the values of the dependent resources are bound to the value of the anchor resource of anchor class A. The creation of dependent structure such as this is comparable to the definition of fields in object-oriented languages; in this example, the-B and the-C function like fields associated with class A. The difference is that in Collage the specification of the creation of the dependent structure is not confined to a single syntactic unit or program artifact. (In addition, triples may be navigated in either direction, unlike fields, which may only be navigated in one direction.)

Thus in Collage, unlike many languages that use classes, there is no single syntactic unit that defines a class. Collage does however support a syntactic abbreviation, <c:with>, that makes it simpler to specify a set of constructs with the same anchor class. For example, unit1.xml from the preceding example (FIG. 41) could be written as follows:

```
unit1.xml
<c:unit>
<c:with anchor="A">
<c:create class="B" property="the-B">
<!-- create dependent resource>
<c:bind>
<!-- bind its value to the value>
<c:in variable="$a"/>
<c:out path="the-B">{$a+1}</c:out>
</c:bind>
</c:with>
</c:unit>
```

While the <c:with> construct in Collage appears in some respects to be comparable to a class definition (of the class A in the example above) in a traditional language, it is more flexible in that it allows the complete definition of a class (including associated behavior and dependent structure) to be composed from multiple independently specified sources.

The approach outlined above represents an orthogonalization of the separate concerns of composition, deployment, classification, value binding, and creation of dependent structure. Consistent with this philosophy, Collage also treats namespaces as orthogonal to each of these concepts, in contrast with many programming languages. Thus, none of the constructs above creates or associates a namespace with its syntactically contained constructs. In particular, while <c:with> appears to be comparable to a traditional class definition, it differs in that it does not implicitly define a namespace scope for its contained constructs. This separation of namespaces from syntactic constructs is a necessary prerequisite for separating the definition of other program aspects, such as classes, from single specific syntactic units. A program can however choose to associate a namespace with a class definition by using the XML namespace mechanism, for example:

```
unit1.xml
<c:unit>
<c:with anchor="A" xmlns : a="namespace-URI">
<c:create class="B" property="a:the-B"/> <!--create dependent resource>
<c:bind>         <!-- bind its value>
<c:in variable="$a"/>
<c:out path="the-B">{$a+1}</c:out>
</c:bind>
</c:with>
</c:unit>
```

The orthogonalization of concerns described above can summarized in a table that distinguishes the Collage approach from the approach taken in traditional languages. The Collage approach supports flexible multi-organization composition, adaptation, and reuse of applications.

The following table summarizes some points of comparison made above between Collage concepts and some roughly analogous concepts from other programming languages. While these comparisons may shed some light on the relationship between Collage and other languages, it is important to understand that the analogies are rough, and may be misleading if applied without caution.

TABLE 1

Traditional versus Collage Distinctions:

| Concept: | Construct: | |
|---|---|---|
| package | <c:unit> | does not define a namespace |
| class definition | <c:with> | does not form a closed class definition, does not define a scope namespace |
| class field | <c:create> <c:let> | may be composed from multiple sources, triples that are bidirectionally navigable |
| class method | <c:bind> | may be composed from multiple sources, declarative constraints on values |

Examples: The declarative data and execution models of Collage support a flexible approach to application development and composition. We illustrate this hereby some examples drawn from application front-ends. However, these programming model capabilities likewise support flexible composition in all tiers of the application.

Flexible decomposition and styling: The choice of a particular view to refine an abstract model resource is determined by the class of the model resource. The Collage/RDF support for multiple and dynamic classification allows a great deal of flexibility in this process because the choice of specific presentation for an abstraction to be made early, by the developer of the abstraction; or later at composition time or run time by a consumer of the abstraction.

Referring to FIG. 42, for example, an interactive calendar abstraction may include a resource of class DATE whose programmatically computed value is a date to be presented to the user, and whose value is updated as a reflection of the act of choosing a date by the user. A more specific choice of presentation for a DATE model, for example, as three fields for year, month and day, may be made by classifying (either early or late) some or all DATE resources in an application with classification DATE3, and defining a set of view resources to be associated with the DATE model resource by virtue of its classification as a DATE3 resource.

Open composition and adaptation. The open approach taken by the present principles (and RDF) for definition of structure and function associated with classes supports flexible multi-organizational composition and adaptation of applications. For example, suppose that IBM partners with a book store to provide IBM employees with supplies such as books. The partnership agreement requires that IBM modify "stock" user interfaces and processes, such as adding provision to specify an IBM approver for each order. This might require that IBM insert an approver field in each submitted IBM order, and a corresponding input field into the ordering page.

For example, an interactive calendar abstraction in Collage may consist of a resource of class DATE whose programmatically computed value is a date to be presented to the user, and whose value is updated as a reflection of the act of choosing a date by the user. A more specific choice of presentation for a DATE model, for example as three fields for year, month and day, may be made by classifying (either early or late) some or all DATE resources in an application with classification DATE3, and defining a set of view resources to be associated with the DATE model resource by virtue of its classification as a DATE3 resource.

Open composition and adaptation: The open approach taken by Collage and RDF to definition of structure and function associated with classes supports flexible multi-organizational composition and adaptation of applications.

For example, suppose that IBM partners with Bookseller to provide IBM employees with supplies such as books. The partnership agreement requires that IBM modify "stock" Bookseller user interfaces and processes, such as adding a provision to specify an IBM approver for each order. This might require that IBM insert an approver field in each submitted IBM order, and a corresponding input field into the ordering page.

The following figure shows a fragment of the Bookseller code for the customer order form, including portions of the definition of the order form model (1) and of the order form presentation (2). Also shown is a fragment of code separately specified by IBM to customize the Bookseller order form, including the addition of an approver field to the model (3) and of a corresponding presentation item (4).

Figure 43:
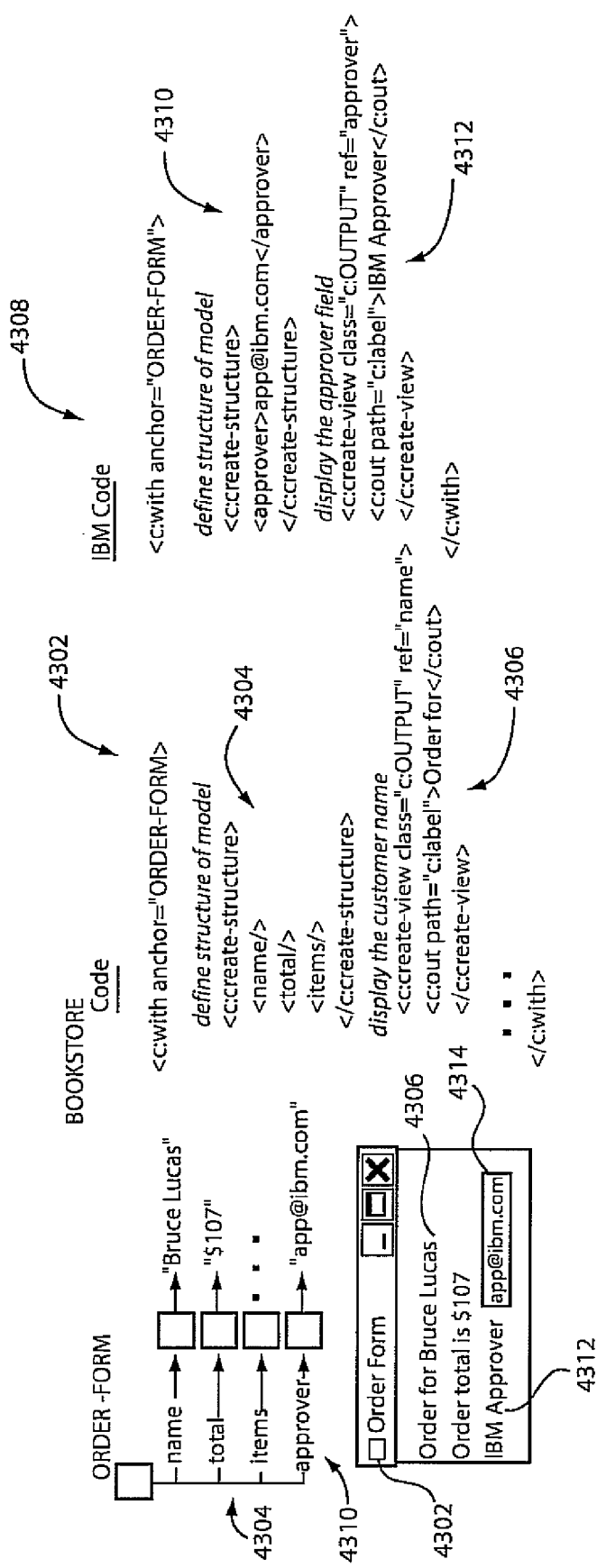
FIG. 43 is a diagram showing a form, graphs and corresponding code for an example for multi-organizational changes that can be made to resources in accordance with one illustrative embodiment.

Referring to FIG. 43, a fragment 4302 of bookstore code for a customer order form is illustratively shown. Bookstore code 4302 includes portions of the definition of an order form model 4304 and of the order form presentation 4306. Also shown is a fragment 4308 of code separately specified by IBM to customize the bookstore order form 4302, including the addition of an approver field 4314 to the model 4310 and of a corresponding presentation item 4312.

Thus, while the <c:with> construct (4302 and 4308), which is an anchor construct, in accordance with the present embodiment is comparable in some respects to a class definition (of the ORDER-FORM class in the example above), it is more flexible in that it permits the complete definition of a class to be composed from multiple independently specified sources. This approach supports flexible multi-organization composition of applications.

Having described preferred embodiments of systems and methods (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for distributed computation, comprising:

providing a first service of a first computation node in a network of nodes, the first service having a first resource, the first resource including one of references to data and other resources;

in a second service on a second computation node, referencing the first resource by associating the first resource in the second service for use in the second service; and performing a distributed computation using one or more processors across node boundaries using the references of the first resource to perform the computation in the first service and in the second service.

2. The method as recited in claim 1, wherein the first service and second service are each deployed on a different logical computing node, and providing a root uniform resource locator (URL) root for all resources managed by a respective service.

3. The method as recited in claim 2, wherein the URLs are configured to cross node boundaries by employing a URL prefix associated with a different service.

4. The method as recited in claim 2, wherein the second service includes a triple whose resources are identified with a URL prefix of the first service.

5. The method as recited in claim 1, wherein one of the first and second services includes a browser.

6. The method as recited in claim 1, further comprising changing a value of a resource managed by one of the first and second service causes a change to the value of a resource managed by the other of the first and second service to result in distributed program execution.

7. The method as recited in claim 1, wherein the data includes triples and the method further comprises associating triples with services, including replicating a shared state across the services, based on uniform resource locators (URLs) of a subject resource and an object resource.

8. The method as recited in claim 1, further comprising a support protocol for distributed program execution wherein the method further comprising defining a set of extensible markup language (XML) message elements, which are batched in a message envelope to permit communication.

9. The method as recited in claim 8, wherein the message envelopes are transmitted as request and response payloads of hypertext transfer protocol (HTTP) post requests directed at service uniform resource locators (URLs).

10. A computer readable storage medium storing a computer readable program for distributed computation, wherein the computer readable program when executed on a computer causes the computer to perform the steps of:

providing a first service of a first computation node in a network of nodes, the first service having a first resource, the first resource including one of references to data and other resources;

in a second service on a second computation node, referencing the first resource by associating the first resource in the second service for use in the second service; and performing a distributed computation across node boundaries using the references of the first resource to perform the computation in the first service and in the second service.

11. The computer readable storage medium as recited in claim 10, wherein the first service and second service are each deployed on a different logical computing node, and providing a root uniform resource locator (URL) root for all resources managed by a respective service.

12. The computer readable storage medium as recited in claim 11, wherein the URLs are configured to cross node boundaries by employing a URL prefix associated with a different service.

13. The computer readable storage medium as recited in claim 11, wherein the second service includes a triple whose resources are identified with a URL prefix of the first service.

14. The computer readable storage medium as recited in claim 10, wherein one of the first and second services includes a browser.

15. The computer readable storage medium as recited in claim 10, further comprising changing a value of a resource managed by one of the first and second service causes a change to the value of a resource managed by the other of the first and second service to result in distributed program execution.

16. The computer readable storage medium as recited in claim 10, wherein the data includes triples and the method further comprises associating triples with services, including replicating a shared state across the services, based on uniform resource locators (URLs) of a subject resource and an object resource.

17. The computer readable storage medium as recited in claim 10, further comprising a support protocol for distributed program execution wherein the method further comprising defining a set of extensible markup language (XML) message elements, which are batched in a message envelope to permit communication.

18. The computer readable storage medium as recited in claim 17, wherein the message envelopes are transmitted as request and response payloads of hypertext transfer protocol (HTTP) post requests directed at service uniform resource locators (URLs).

19. A method for distributed computation, comprising:

providing a first service of a first computation node in a network of nodes, the first service having a first resource, the first resource including one of references to data and other resources;

in a second service on a second computation node, referencing the first resource by associating the first resource in the second service for use in the second service; and performing a distributed computation using one or more processors across node boundaries using the references of the first resource to perform the computation in the first service and in the second service, wherein a service comprises a root uniform resource locator (URL) that identifies and locates the service and is the base URL for all resources managed by the service, a triple store that represents the runtime state of the system as a set of resource description framework triples, a set of composition units, and a set of resources that are managed by the service.

* * * * *